United States Patent
Beam

(10) Patent No.: US 9,888,219 B1
(45) Date of Patent: Feb. 6, 2018

(54) ADJUSTABLE OPTICAL MASK PLATE AND SYSTEM FOR REDUCING BRIGHTNESS ARTIFACT IN TILED PROJECTION DISPLAYS

(71) Applicant: Electric Picture Display Systems, Inc., Melbourne, FL (US)

(72) Inventor: Craig Beam, Satellite Beach, FL (US)

(73) Assignee: Electric Picture Display Systems, Melbourne, FL (US)

( * ) Notice: Subject to any disclaimer, the term of this patent is extended or adjusted under 35 U.S.C. 154(b) by 0 days.

(21) Appl. No.: 15/290,642

(22) Filed: Oct. 11, 2016

Related U.S. Application Data

(60) Provisional application No. 62/239,329, filed on Oct. 9, 2015.

(51) Int. Cl.
| | |
|---|---|
| *H04N 9/31* | (2006.01) |
| *G03B 21/14* | (2006.01) |
| *G02B 26/02* | (2006.01) |

(52) U.S. Cl.
CPC ........... *H04N 9/3147* (2013.01); *G02B 26/02* (2013.01); *G03B 21/142* (2013.01); *H04N 9/3185* (2013.01); *G03B 2205/0092* (2013.01)

(58) Field of Classification Search
CPC .. H04N 9/3147; H04N 9/3185; H04N 9/3197; H04N 9/3129; H04N 9/3141; H04N 5/64; H04N 5/65; H04N 9/31; G02B 26/02; G03B 21/142; G03B 2205/0092; G09G 5/14; G09G 2300/026
USPC ......... 348/383, 739, 744, 839–842; 345/629, 345/1.3; 353/30, 97
See application file for complete search history.

(56) References Cited

U.S. PATENT DOCUMENTS

| | | | |
|---|---|---|---|
| 2,721,391 A | 10/1955 | Von Duyke | |
| 2,759,271 A | 8/1956 | Von Duyke | |
| 2,949,674 A | 8/1960 | Wexler | |
| 5,661,531 A * | 8/1997 | Greene | ............ G02F 1/133512 349/73 |
| 6,590,621 B1 | 7/2003 | Creek | |
| 7,193,654 B2 | 3/2007 | Baker | |
| 7,296,902 B2 | 11/2007 | Gilbert | |
| 2014/0098348 A1 | 4/2014 | Langley | |

FOREIGN PATENT DOCUMENTS

| | | |
|---|---|---|
| CA | 2227920 | 1/1998 |
| EP | 1710621 | 11/2006 |

* cited by examiner

*Primary Examiner* — Sherrie Hsia

(74) *Attorney, Agent, or Firm* — Ferdinand M. Romano; Beusse Wolter Sanks & Maire

(57) ABSTRACT

An image projection system of the type which directs at least a pair of overlapping image tiles toward a screen, with portions of each image tile in the pair directed toward an overlap region on the screen, comprising an optical mask apparatus for defining on the overlap region a transition zone between projection of one or the other of the overlapping tiles, the optical mask apparatus including first and second optical mask plates, each providing an edge profile to define a line or zone of transition, when the system projects the pair of overlapping image tiles toward the screen, by each plate blocking a portion of a different one of the two adjacent projection beams with a provided edge profile to create a transition between portions of an image formed on the overlap region with the different projection beams.

17 Claims, 22 Drawing Sheets

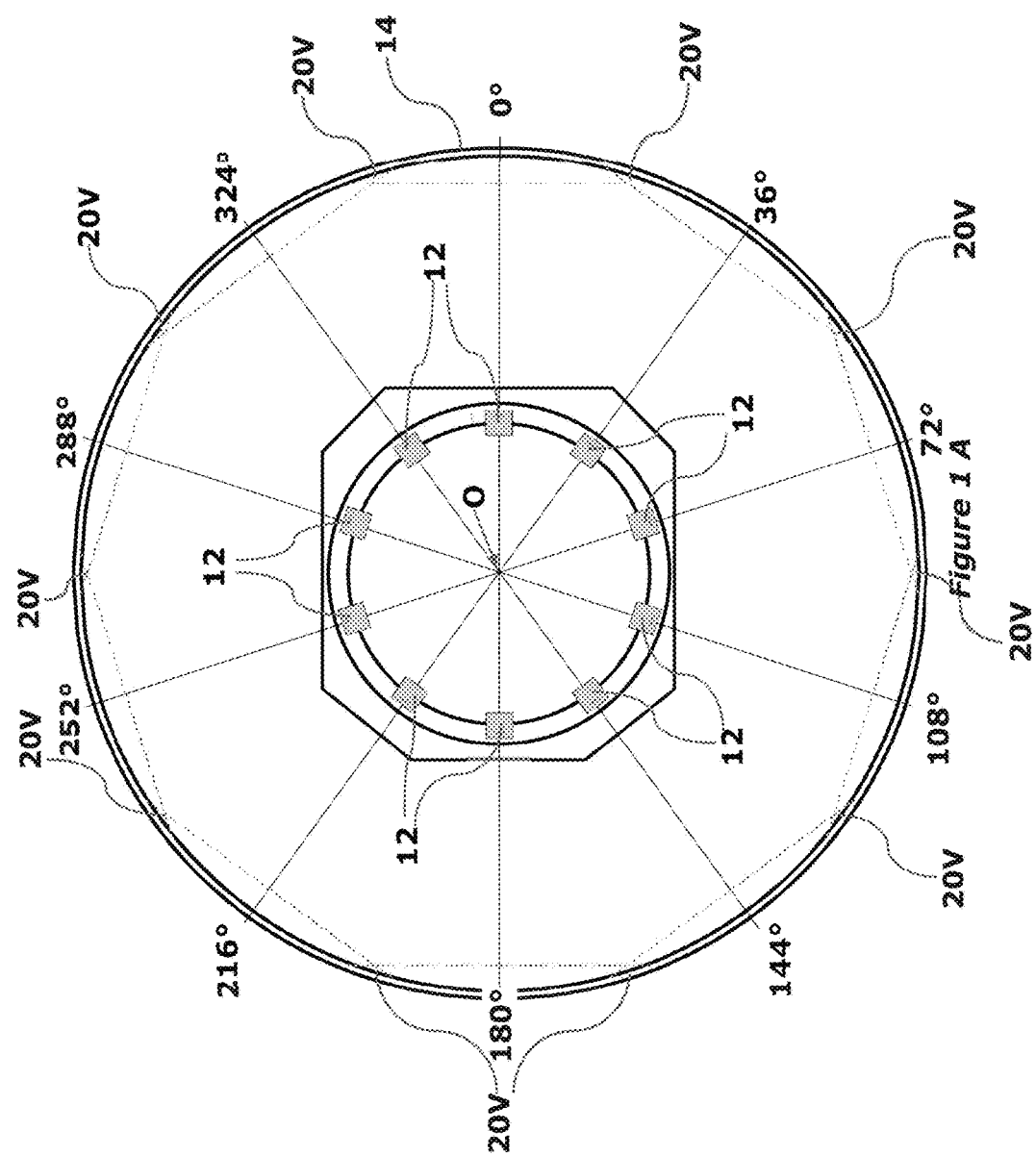

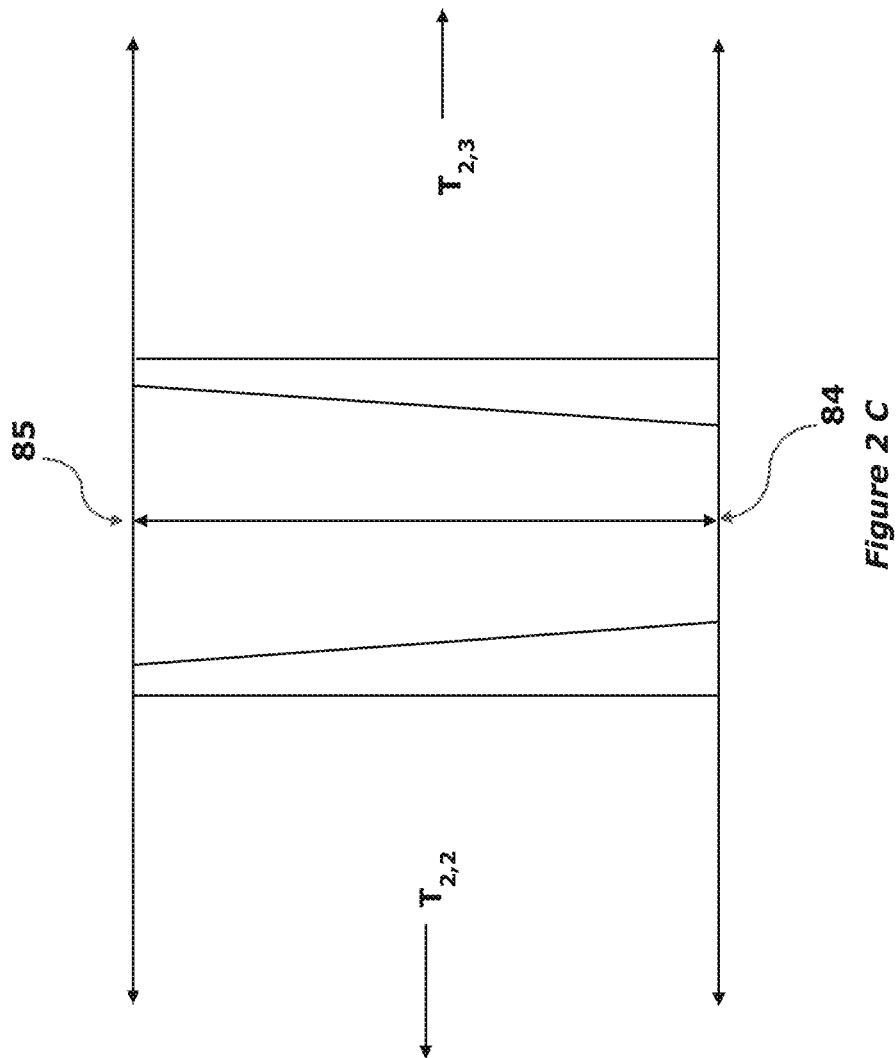

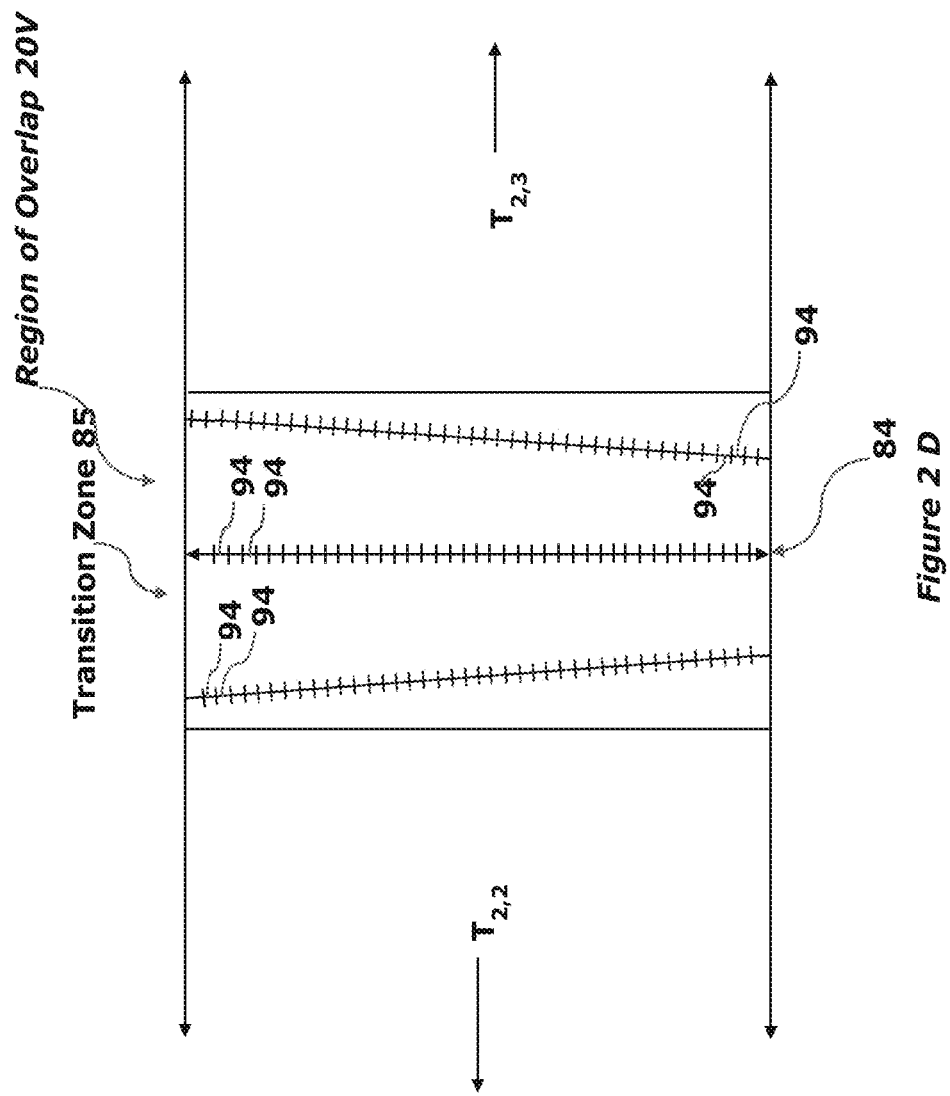

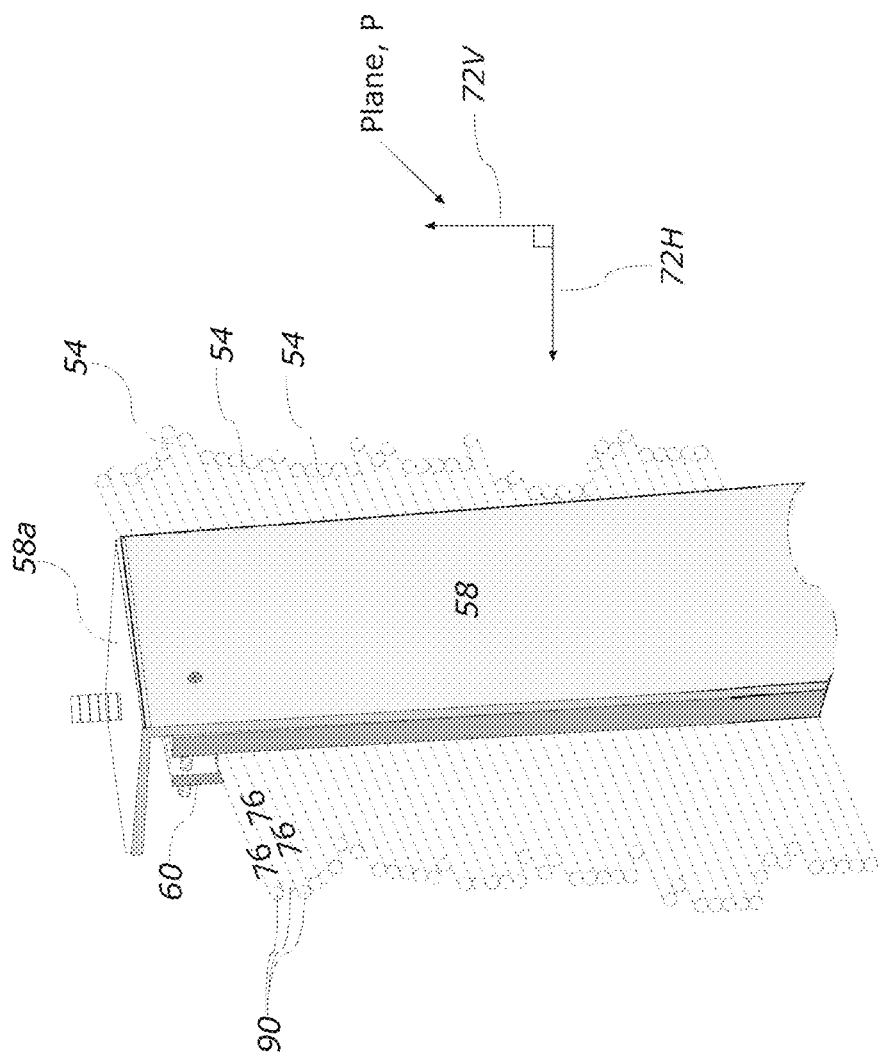
*Figure 3D alternate*

ADJUSTABLE OPTICAL MASK PLATE AND SYSTEM FOR REDUCING BRIGHTNESS ARTIFACT IN TILED PROJECTION DISPLAYS

BACKGROUND OF THE INVENTION

Modern digital projection systems use spatial light modulators, also referred to as light valves or digital light processors. This technology has enabled higher levels of picture quality and realism. There is a growing demand to create large panoramas with digital projection technologies in many economic and industrial sectors. These include entertainment, video-gaming, simulation training, military operations, advertising and business applications, all of which require or benefit from projection of large, high-quality images. With demand for display of large, high-resolution continuous images, system designs must address numerous complex projection problems. For example, image displays on large cylindrical and dome-shaped screens often require projection of a series of overlapping images. Each projected image is generated from a separate projector in a multi-channel display system to build extended horizontal or vertical fields of view, e.g., up to 360°. However, sustaining high image quality in the transitions between adjoining image tiles can be difficult in view of optical effects and brightness issues resulting from pixel overlap.

To enhance realism it is desirable to render transitions between individual image tiles unnoticeable, i.e., seamless. Achieving a seamless transition between adjoining image tiles depends in part on alignment of pixel data from different projectors on the screen. Additional treatments are commonly applied to regions where beams from different projectors contain overlapping image data. Otherwise, abrupt changes in brightness would result from projection of duplicate pixel data onto the same region of a screen. The term "soft edge matching" was coined in the 1990's and involved overlapping these images to transition the end of one channel with the start its adjacent channel.

A variety of treatments have been applied to mitigate such noticeable changes in screen brightness, but these have performance limitations or other disadvantages. With multiple projectors beaming the same pixel information toward a region of overlap, treatments for image blending include software-driven electronic adjustments and hardware-based techniques. Software-driven electronic adjustments, referred to as "software blending", have proven to be an effective alternative to system designs which closely align image tiles without permitting any overlap of the pixel information in adjoining tiles. As systems incorporate larger or more complex projection geometries, it becomes more difficult to connect non-overlapping image projections while retaining a high quality, seamless appearance, e.g., without creating disruptions at the interfaces of tile edges being joined into a continuous image.

All blending techniques attempt to adjust the spatial distribution of screen brightness to approach levels which would otherwise result from a single image projection. However, some of these blending techniques may compromise image resolution and may be less satisfactory under conditions of low screen brightness levels.

Brightness adjustments effected with software blending can create seamless transitions between image tiles by adjusting the screen brightness within individual tile projections, i.e., by digitally varying projector output levels as a function of pixel position on the screen. Software blending adjusts the contribution to a screen brightness level from each of multiple projectors across a blend zone. This reduces the net brightness level in a region of overlap from a level which would otherwise include additive effects of duplicate image information on the same screen area. In a well-known implementation of software blending across a region of image tile overlap, the brightness level contribution from one projector spatially varies along one direction from a maximum value to a minimum value while the brightness level contribution from an adjacent projector spatially varies along the same direction from a minimum value to a maximum value.

Software blending can generate acceptable brightness levels to provide a seamless transition across a region of image tile overlap, provided there is sufficient dynamic range to modify the levels to a visually acceptable brightness. At relatively high brightness levels software blending methods can adjust screen brightness levels in a region of tile overlap that would be equivalent to the levels produced by one projector beam. However, software blending is less effective at low light levels (e.g., night training) despite off-state pixels which, in theory, do not illuminate on-screen. The projector lamp produces excess light bouncing off of reflective surfaces and various internal lenses within the projector, and low level residual light is still emitted from the projector's objective lens even with no active pixels on-screen. Systems using digital mirrored modulating devices (e.g., TI's DLP, SONY's SXRD) do not provide a true black light level (i.e., no light output) as the lowest level of screen brightness. Rather, at the darkest level (e.g., a digital zero), systems comprising digital light processors project some light. In regions of tile overlap, when a brightness level is supposed to be at or near digital zero, the brightness level which results after adjustment with software blending can remain noticeably too high. There is limited dynamic range available to optimally reduce brightness resulting from duplicate pixel data. As the brightness levels output by the projectors approach a minimum digital value, it becomes impossible to electronically reduce screen brightness due to overlapping pixels by, for example, thirty to eighty percent. Consequently, at such very low light levels, visibly evident brightness artifact are not removed by software blending. When image tile overlap regions display night scenes containing important but relatively dim image information (i.e., at or near the lowest digital values), features inherent to the projector display technology limit the precision of brightness adjustment. Under these conditions, software blending methods cannot create the desired seamless transition between image tiles.

In lieu of software blending, two distinct types of hardware-based optical device designs and methods have been used to adjust regions of image tile overlap in tiled arrays: optical blending and optical blocking. These may be used in place of or in addition to software blending methods. Both optical blending and optical blocking are useful alternatives under low light conditions. Optical blending is accomplished with blend plates while optical blocking is performed with blocking mask plates. Although similarities exist between a few of the components in optical blending systems and optical blocking systems, optical blend plates do not and cannot perform the functions of optical blocking mask plates.

The primary function of an optical blend plate is to blend or mix and to smooth abrupt changes in brightness levels across regions of tile overlap. Blend plates do not completely block off light along each side of an image tile transition line. Rather, they retain overlapping pixel data while reducing overall light levels in tile transition zones to reduce noticeability of transitions between adjoining edge tiles. Generally, optical blend plate designs form a class of devices that obscure transitions between image tiles by scattering some of the light present in the projection beams. For each pair of overlapping projection beams, a pair of blend plates creates a blend zone on the projection screen. This is accomplished by insertion of edge profiles in front of portions of the two overlapping projection beams. Through absorption or scattering, blend plate edge portions remove or redistribute light before the beams impinge on blend regions on screen. Scattering is effected by incorporating light mixing features along the edge profiles. The light mixing features enhance reflection or diffraction in the portions of the beam adjoining the transition between image tiles. Some of the scattered light may impinge on the projection screen.

Optical blending can create sufficient diffuse light or scattering by edge diffraction techniques to spatially modify brightness levels within a tile overlap region and thereby provide a seamless transition zone. The light may be absorbed or diffused in a limited portion of an image projection by placing a series of closely spaced surfaces in part of the path of the projection beam. The resulting scattered light reduces the spatial gradient in brightness level across the transition zone to render the tile transitions less noticeable. On the other hand, the scattering process could introduce significant noise with possible loss of pixel resolution. These effects must be limited to avoid obscuring image details in low light level scenes and to avoid noticeable degradation in image quality.

The closely spaced features of light mixing edge profiles used for optical blending may be regular patterns (e.g., saw tooth patterns) or spaced-apart appendages having relatively small feature sizes (e.g., formed with fine brush hairs or comb-like teeth). These features may extend from one or more larger members of a blend plate for insertion into an image projection path. The blend plate light-mixing edge profiles do not and cannot operate as optical blocking masks. This is because such regular patterns and appendages do not transfer a shadow contour consistent with necessary blocking patterns. The features do not conform to provide a line of transition that removes duplicity of pixel projections in adjoining image tiles. Rather, projection of such small, spaced-apart features is only suitable for blurring or reducing light levels based on scattering or absorption. With light mixing appendages designed to primarily scatter light, these features are not suitable to image a blocking shadow that eliminates pixel data along one side of a transition line. Blend plates cannot transfer mask patterns to create image blocking transitions between adjoining image tiles. Light mixing edge profiles cannot define contours to block patterns of pixels and thereby remove pixel overlap between adjoining image tiles. Blend plates are not designed to provide necessary mask resolution to minimize or eliminate duplicate pixels along a line or narrow zone of transition between adjoining image tiles.

In contrast to optical blending, blocking masks reduce or completely remove pixel overlap in regions of adjoining image tiles. This minimizes projection of duplicate pixel data. For a transition between two overlapping projection beams, each in a pair of blocking mask plates has an edge profile designed to prevent a portion of the duplicate pixel data in each of the two beams from impinging on the projection screen. Each blocking mask edge profile provides a contour which blocks light along a common line, e.g., in a narrow zone of transition between image tiles. On each side of the line or zone the screen receives pixel data from only one projection beam. By defining a transition line or zone in the region of overlap, each blocking mask removes pixel data from a different one of the beams on each side of the line or zone to eliminate projection of duplicate data onto the screen.

In the past, to accurately define the line or zone of transition within the region of tile overlap, edge profiles of blocking mask plates have been designed and fabricated based on, for example, the projection beam angles relative to the screen and the shape of the screen. In some cases the modeling can closely approximate necessary contours to remove brightness effects when, for example, the keystone effect is present on a cylindrically shaped screen (e.g., due to the fact that the projector may not have a lens shift and physically must be angled down/out of sight of the viewer, either overhead or underneath). Effective design of blocking mask plates becomes more challenging as projection systems incorporate more complex optical geometries and corrections to accommodate these geometries. To some extent optical distortions are correctable with software. Nonetheless, complex geometric effects can produce image tile projections which have tapered or nonlinear shapes. The shapes of the tile projections can be more complex when the screen has curvature in both horizontal and vertical directions.

With greater demands for higher levels of picture quality under conditions of low brightness levels, the known optical device designs and methods for creating seamless tile transitions either have intrinsic performance limitations or require greater cost due to increased system complexities. For example, when training and simulation systems display night scenes over water, the ability to resolve low light level information may be unsatisfactory, particularly when high brightness levels, due to duplicate pixel data, are present. These bright zones may persist when optical blending cannot sufficiently reduce light levels over a zone (e.g., by light scattering) or when blocking masks do not sufficiently follow a contour that substantially or completely prevents duplicate pixels from striking the screen.

Deficiencies in contours of blocking mask patterns may not be apparent until system installation, i.e., when bright zones become viewable on the screen. Then, to more completely remove bright zones caused by duplicate pixels, adjustments are made to the edge profiles of the blocking mask plates. Repetitive fabrication of the plates to optimize mask patterns adds significant time and expense. It can be a costly and difficult process to consistently remove excess brightness and create seamless transitions between image tiles under low light level conditions. There is a need for an improved apparatus and a method to define satisfactory patterns for light blocking along regions of tile overlap on the projection screen. Such an apparatus and method should reduce fabrication costs for blocking masks, reduce the time required for designing the masks, and reduce the time required to adjust the masks during and after system installation.

BRIEF DESCRIPTION OF THE FIGURES

In accordance with common practice, the various described features are not drawn to scale, but are drawn to emphasize specific features relevant to the invention. Like reference characters denote like elements throughout the figures and text.

FIG. 1A is a plan view of a display system providing 360° imaging on a cylindrical screen;

FIG. 3D is a partial perspective view of the mask plate shown in FIG. 3A illustrating edge surfaces of the ends of the rods;

FIGS. 5A-E illustrate an optical blocking mask apparatus according to another embodiment wherein:

FIG. 5A illustrates a partial view of the positioning and adjustment frame according to an alternate embodiment comprising three mask plates and with an actuator motor in a retracted position;

FIG. 5B, illustrates a partial view of the positioning and adjustment frame of FIG. 5A with the actuator motor 82 in an extended position;

FIGS. 5C and 5D are partial side views of a double jointed assembly, an angle adapter and other components in a third arm of the positioning and adjustment frame shown in FIGS. 5A and 5B;

FIG. 5E provides a side perspective view of the double jointed assembly, angle adapter and other components in a third arm of the positioning and adjustment frame shown in FIG. 5D;

DETAILED DESCRIPTION OF THE INVENTION

Figure 1B:
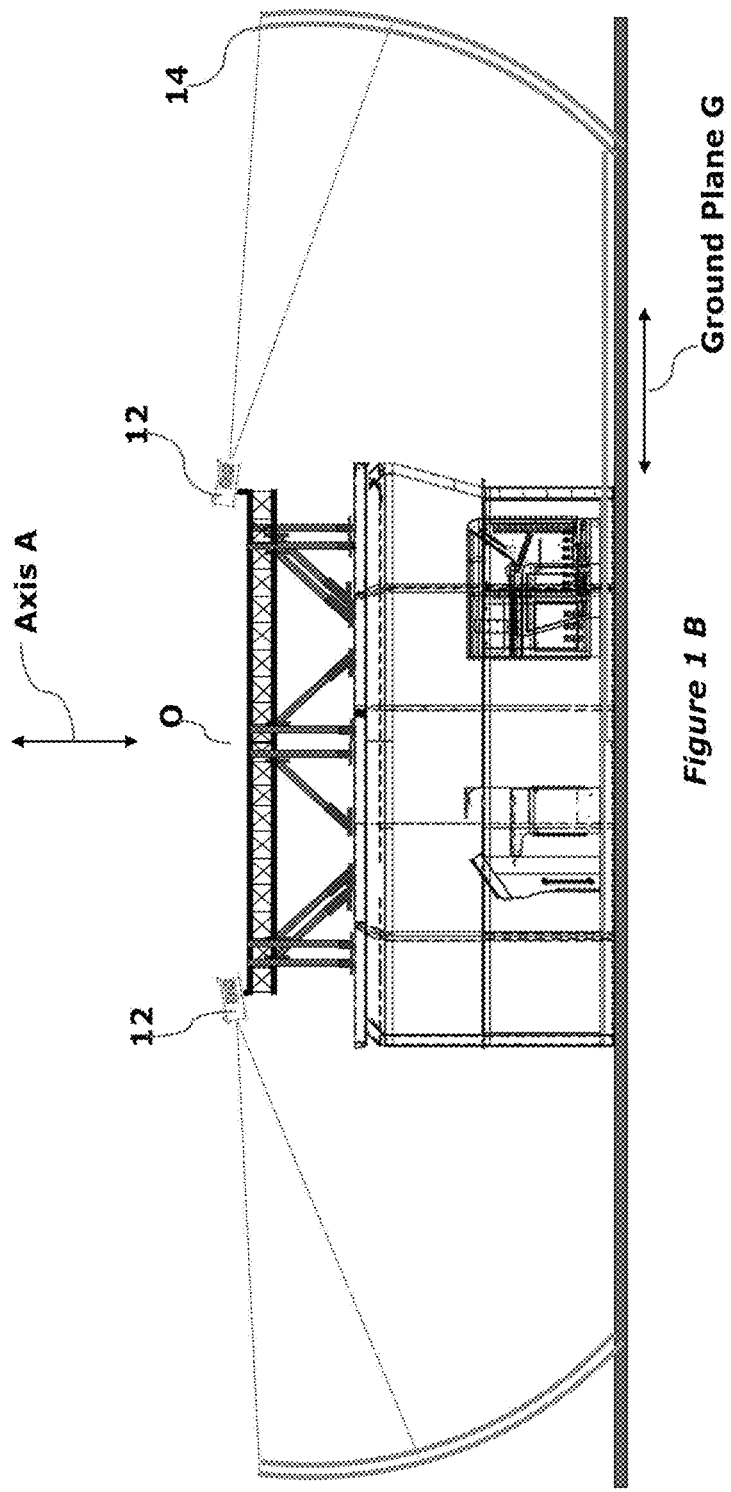
FIG. 1B is a partial elevation view of the display system shown in FIG. 1A showing two projectors in a row $R_1$.

Before describing in detail particular devices and methods according to embodiments of the invention, it should be observed that the present invention resides primarily in a novel and non-obvious combination of elements forming a projection system and steps for adjusting and operating such a system. So as not to obscure the disclosure with details that will be readily apparent to those skilled in the art, certain conventional elements and steps are omitted or presented with lesser detail, while the drawings and the specification describe in greater detail other elements and steps pertinent to understanding the invention. The following embodiments are not intended to define limits as to any structure or method of the claimed invention, but only to provide exemplary constructions. The embodiments are permissive rather than mandatory and illustrative rather than exhaustive.

The term optical blocking mask as used herein is limited in meaning to that of a simple blocking mask, i.e., a plate having an edge profile used to cast a border along an image plane of a projection screen. The border projected onto the screen defines the edge of a shadow region based on the shape of the edge profile. For optical blocking masks in the prior art as well as those according to the invention, a projection beam impinging on the blocking mask edge profile creates no more than incidental levels of light diffusion or diffraction. These levels of scattering are relatively insignificant in that they do not impose a noticeable change in the desired size or shape of an intended image blocking transition zone in a region of image tile overlap. A blocking mask according to the invention substantially prevents pixel data present in one projection beam from striking the screen on one side of a line or zone while permitting the light to impinge upon portions of the screen on the other side of the line or zone. Ideally, for each projection beam, a blocking mask plate eliminates substantially all projection of duplicate data on one side of a line while allowing the beam to project pixel data on portions of the screen on the other side of the line. With two overlapping projection beams, each of two blocking mask plates sufficiently eliminates projection of duplicate data on a different side of the line or zone to create a seamless transition. With a pair of mask plates, a set of pixel data present in each projection beam is substantially blocked by one mask plate on only one side of the line or zone so that brightness artifacts are mitigated in regions adjoining the line or zone. The term brightness artifact as used herein refers to excessive levels of screen brightness due to projection of duplicate pixel data in a region of image tile overlap. Based on above-noted distinctions between blend plates and blocking mask plates, optical blocking mask plates as referred to herein do not include any members in the class of optical blend plates.

Embodiments of an optical blocking mask apparatus according to the invention comprise a blocking mask plate having a pattern which can be spatially adjusted during installation and then fixed. The plate can later be re-adjusted should the need arise (e.g. due to gravity, effects of building vibration over time, inadvertent bumping, etc). The apparatus comprises one or more relatively simple optical blocking mask plates analogous to the type used in pattern transfer, such as in a photolithographic process. The blocking mask plates are used to define blocking regions which transmit essentially no light, analogous to the dark zone which borders a bright region when effecting a pattern transfer. The border of a shadow region cast on the screen surface by a mask plate edge profile defines a line along one side of which image projection is blocked. Thus the edge region of each optical blocking mask plate creates along the screen surface a transition between a relatively high brightness level, resulting from impinging pixel data, and a relatively dark level due to absence of pixel data. The contour of the image border transition is determined by the shape of the mask plate edge profile, i.e., along the peripheral edge of the mask plate edge region. The mask plate edge region has a profile suitable to define a line or a narrow zone of image border transition without creating any reflection or diffraction of light other than minor reflection and diffraction effects resulting from impingement of light about the peripheral edge of the mask plate edge region. The edge region is adjustable to prevent projection of a selected portion of the pixel information from one image tile onto the screen. Such generation of the line or zone of transition by optical projection can result in a smooth, continuous and seamless transition between image tiles. This is especially true when mapping a two dimensional projected image onto a three dimensional curved or parabolic projection surface.

In prior designs of blocking mask plates, the contour along the periphery of the mask plate edge, as well as the contour of the resulting line of image border transition projected on the screen (i.e., along which image projection is blocked), have had a continuous slope, m, such that there has been no discontinuity in the slope. That is, dm/dx, the change in slope along a direction x is always a defined number.

Designs of blocking mask plates according to the invention have contours along the periphery of the mask plate edges which are composed of discrete members, e.g., rod ends. In example embodiments transitions along the mask plate edge contour, between adjoining discrete members, are in the shapes of steps. More generally, because the discrete members may be displaced with respect to one another, to vary the contour, the slope along the contour is made variable, and can transition from a horizontal slope, m, of zero, to a vertical slope, m, which is undefined, as illustrated for an embodiment of the invention. Unlike prior designs of blocking masks, the slope is not a continuous function. Notwithstanding this distinguishing feature of a blocking mask embodiment, the contour of the resulting transition projected along the screen (i.e., along which a portion of a projection beam is blocked), may nonetheless have the appearance of a continuous slope m, i.e., no discontinuity in the slope, such that dm/dx is always a defined number.

FIG. 1 provide partial views of an exemplary display system 10 which creates a high resolution continuous image on a screen with overlapping image tiles. The screen may be any of several shapes, such as a cylindrical or parabolic shaped screen extending partly up to, or fully to, 360°. Recognizing that the surfaces of projection screens may have curvature in vertical as well as horizontal directions, the term image plane is not at all limited to flat planes or planes of any specific shape. A circular row of ten projectors 12 and a circular section of a parabolic screen 14 are illustrated in the plan view of FIG. 1A. Both the row of projectors and the circular section of the screen 14 are parallel with the horizontal ground plane, G, shown in FIG. 1B. The system 10 may have as few as one row of projectors, but the illustrated embodiment has multiple rows of projectors 12. As shown in FIG. 1B, the screen 14 has an exemplary parabolic shape which extends 360° symmetrically about a point, O, and a central axis, A.

Figure 2A:
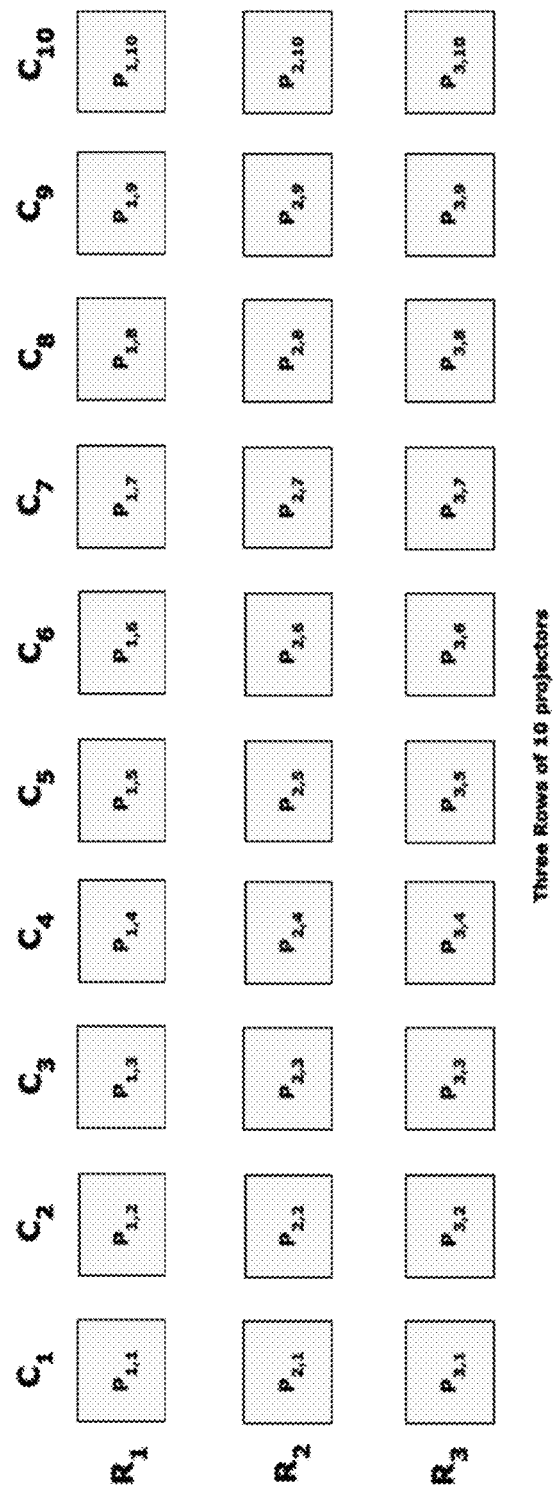
FIG. 2A schematically illustrates a series of projectors 12 in the system of FIG. 1 arranged in rows and columns.
Figure 2:
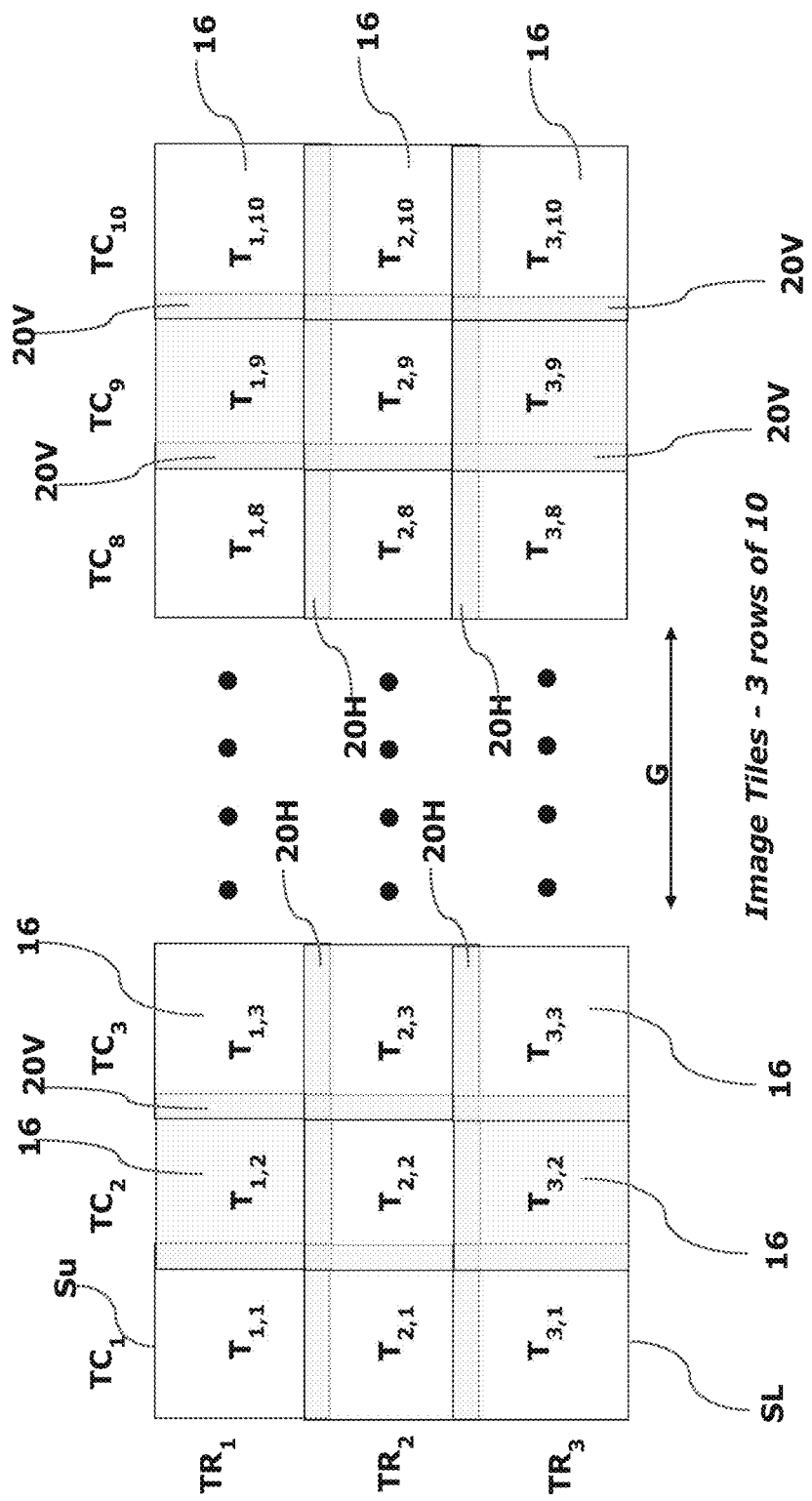
FIG. 2B schematically illustrates a series of overlapping image tiles 16 arranged in rows $R_i$ and columns $C_j$ as projected on the screen of the system 10.
FIG. 2C is a simplified partial schematic view illustrating exemplary lines of transition between adjoining image tiles created by the system of FIG. 1.
FIG. 2D illustrates segments in the exemplary lines of transition of FIG. 2C resulting from edge surfaces of rod ends of the adjustable mask plate shown in FIG. 3.
FIG. 2E illustrates image quality changes in a screen region of overlapping image tiles beginning prior to insertion of blocking mask plates and concluding with a continuous image across a single transition line between data in adjoining image tiles.
Figure 2:
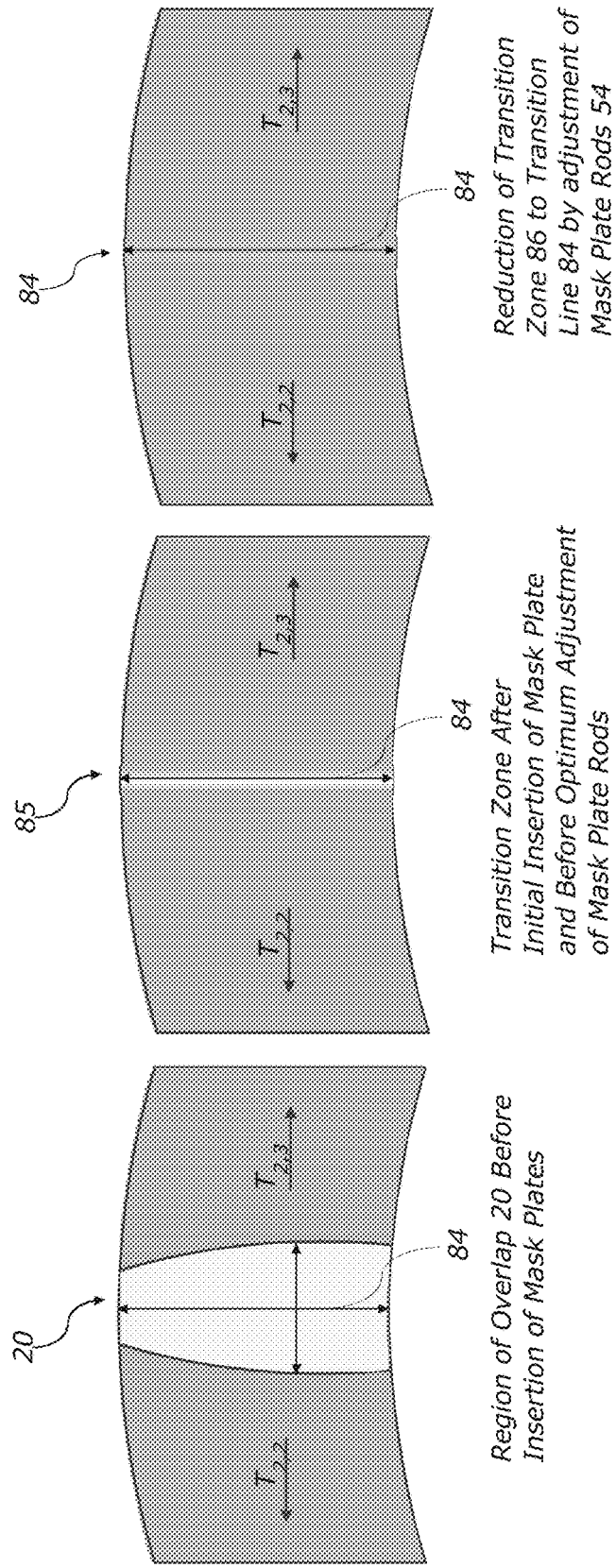

With reference to FIG. 2, the system 10 comprises multiple rows, $R_i$, of ten projectors 12, vertically positioned in columns $C_j$, row over row, with respect to the horizontal plane, G. In operation each row $R_i$ of ten projectors casts a tile row comprising overlapping image tiles 16 a full 360° around the screen. FIG. 2A schematically illustrates an exemplary array of thirty projectors in the system 10, with each projector 12 identified as an array member $P_{i,j}$. The number of projectors in each row and the number of rows of projectors may vary. For the illustrated embodiment the projectors 12 are arranged in three rows $R_1$, $R_2$, $R_3$ of ten projectors. Projectors in different rows are stacked, one over another, forming ten vertically aligned columns $C_1$ to $C_{10}$ of three projectors. With the projectors formed in such a multi-level arrangement, the projectors in different rows direct image tiles 16 toward different vertical levels on the screen 14, from a lowest vertical level $S_L$ to an uppermost vertical level $S_U$. See FIG. 2B.

Along different horizontal planes above the ground plane, G, each row $R_i$ of ten projectors 12 subtends a full 360° as shown for the one exemplary row in FIG. 1A. The array of thirty projectors $P_{i,j}$ creates an array of thirty image tiles $T_{ij}$. Collectively the image tiles $T_{ij}$ form three image tile rows $TR_1$, $TR_2$, $TR_3$ of data on the screen 14. Each image tile $T_{ij}$ in a row $TR_i$ and column $TC_j$ on the screen is received from a projector array member $P_{ij}$ in a corresponding projector row $R_i$ and column $C_j$. With the projectors formed in such a multi-level arrangement of three projector rows $R_1$, $R_2$, $R_3$, the projectors in different rows direct image tiles toward different vertical levels extending from a lowest screen position level $S_L$ to an uppermost screen position level $S_U$. The ten columns of projectors $C_1$ through $C_{10}$ each create on the screen 14 one of ten screen image tile columns $TC_1$ through $TC_{10}$ each containing three image tiles 16. This array arrangement, with image tiles in the same row overlapping one another, and with image tiles in the same column overlapping one another, is schematically shown in FIG. 2B.

For projector array members $P_{i,j}$ positioned next to one another as an adjoining pair, i.e., either in the same circular row $R_i$ or in the same column $C_j$, the screen 14 includes multiple regions of tile overlap 20: vertical regions of overlap $20_V$, occurring where image tiles $T_{i,j}$ in the same row $R_i$ overlap; and horizontal regions of overlap $20_H$, occurring where image tiles $T_{i,j}$ in the same column $C_j$ overlap. Each lens 18 in an adjoining pair of projectors directs a portion of the projection beam containing duplicate pixel data toward at least one region of overlap 20.

According to an embodiment of the invention, each in a pair of optical blocking mask plates 50 selectively blocks a portion of a different projection beam which casts one of two adjoining image tiles $T_{ij}$. As a result of the selective blocking, within a region 20 of tile overlap (e.g., between adjoining tiles $T_{1j}$, $T_{2j}$) the screen 14 does not receive projections containing any duplicate pixel data. In other embodiments, the mask plates block substantial portions, but not necessarily all, of the duplicative pixel data in a region of overlap 20 (i.e., removing sufficient duplicity in overlapping pixel data to provide a seamless tile transition). In either case, with a reduction in duplicate pixel data projected onto the screen 14, there is a sufficient brightness reduction to render the transition between adjoining tiles unnoticeable to the viewer or substantially unnoticeable to the viewer. When compared to software blending techniques, under the lowest levels of screen brightness output from a digital light processor, the mask plates 50 are particularly effective to create a seamless tile transition.

Advantages of the invention are apparent when contrasted with the sometimes unsatisfactory results obtained with an optical mask plate having pre-specified, fixed edge contours, i.e., along the periphery of a conventional mask plate edge. Such a conventional fixed edge contour may be created with a Computer Aided Design (CAD) system to selectively block portions of each image tile projection in a region of overlap. These fixed edge contours may be obtained by applying spatial distribution information to map individual portions of overlapping projections to a screen. The conventional fixed edge contours pre-define portions in overlapping projections which are to be blocked from impinging on screen locations. These contours may also be based on optical modeling of the projected data with an optimization of the blocking effects of the mask plate on the screen. Each fixed edge blocking mask contour obtained with the CAD system defines the edge of a fixed mask plate used to block pixel information from striking the screen on one or the other side of a transition between overlapping image tiles.

Ideally, with the fixed contour along the edge of the mask plate pre-defined, insertion of the plate into the path of the projection beam adequately blocks a predetermined portion of the projection beam so that the screen does not receive projections containing any duplicate pixel data. However, with pre-defined contours defining the mask plate edges, it is sometimes determined at the time of system installation that the optical mask plates do not sufficiently align with the pixel data to remove brightness zones in the regions of overlap 20. It is then necessary to re-design, fabricate and deliver to the installation site new mask plates having different fixed edge contours to more completely remove the brightness zones.

Such unsatisfactory results obtained with CAD system software designs can be due to difficulty in accurately modeling the spatial projection of the image beams on the screen, or errors in aligning projectors, or incorrect positioning of the edge contour of an optical mask plate relative to the desired spatial location of a tile transition line on the screen. These and other difficulties may become more challenging as the projection geometry becomes more complex. In a simple projection system, when an image is projected on a flat screen surface at an angle other than ninety degrees with respect to the optical axis, the keystone effect can render it more difficult to entirely remove excess brightness from a region of overlap. Further, over time, gravity, shock, vibration or bumping may cause repositioning of the projector and lens, thus rendering the fixed CAD-based solution no longer valid, as the projector has deviated from its intended position in 3D space relative to a fixed projection area on the screen. When the variables shift, the shape required to mask the image changes.

In display systems which project overlapping image tiles, the incident angles of the projector beams relative to a plane on the screen may cause other image distortions. These may be corrected optically or digitally to provide acceptable quality in areas other than regions of image tile overlap. However, related effects of certain forms of image distortion that are difficult to fully correct may have an adverse effect on efforts to reduce brightness levels in the regions of image tile overlap 20. For example, distortions of image tile borders can render it more difficult to accurately model the image tile brightness contours as needed to completely eliminate brightness artifact in these regions. The situation is compounded by unplanned changes in geometry, such as minor changes in projector elevation relative to a screen. This can be more problematic in systems utilizing screen surfaces having curvature along a vertical direction with respect to the ground plane. These complexities can result in spatial distributions of pixels which render it difficult to accurately predict satisfactory edge contours for optical mask plates.

Optical masks according to the invention comprise plates having adjustable edge contour configurations. Contours are articulated with sufficient resolution to remove excess brightness encountered with complex screen geometries. In the past, adjustable optical plates were only used to create blend regions (e.g., regions which retained substantial overlapping pixel data) by reducing overall light levels to obscure the transitions between adjoining image tiles. Blend plates were not designed to articulate necessary contours in order to block overlapping pixel data. Rather, the optical blend plate designs satisfied less demanding requirements to spatially reduce screen brightness by scattering of light. Blocking mask plates selectively remove pixel data from different projection beams on different sides of a tile transition line or transition zone. Adjustable optical blocking mask plates of the present invention articulate contour shapes with sufficient resolution to adequately remove zones of high brightness levels. In contrast to the invention, even if a blend plate did not incorporate features that enhance reflection or diffraction, the blend plate would not articulate the contour with sufficient resolution to adequately block the portion of duplicate pixel data on one side of a transition line or transition zone to prevent impingement of duplicate pixel information on the screen.

Optical masks according to the invention may be of increasing importance because, as the spatial resolution of a projected image increases, the pixel density per unit area of the projection lens also increases, and the pixel density per unit screen area may also increase (e.g. 4K display systems offering 4×1080p Pixels, and higher aspect ratio high definition wide screen display systems where multiple projected images create wrap-around, immersive visual environments. With such increases in pixel density comes a need for greater precision in articulation of each transition line or zone in a region of overlap in order to nearly or completely prevent impingement of duplicate pixel information by multiple projectors on a display screen.

Figure 3A:
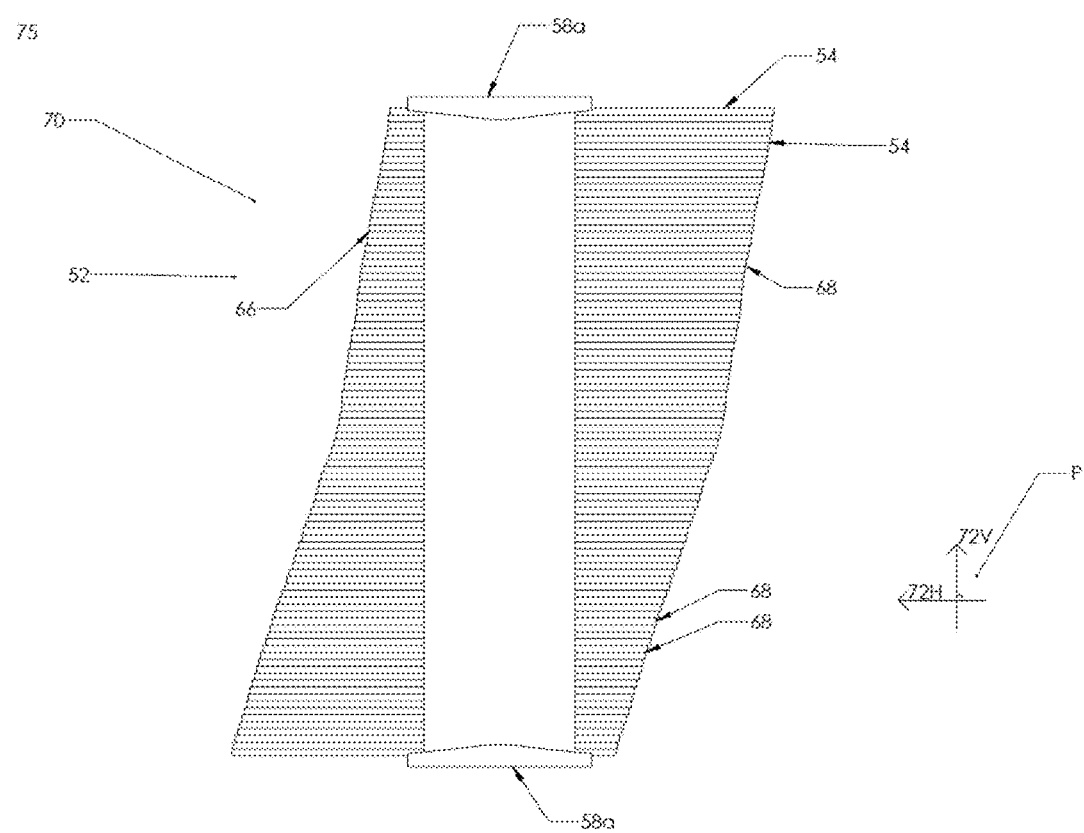
FIG. 3A is a partial perspective view of an optical mask apparatus comprising a mask plate according to the invention.
Figure 3B:
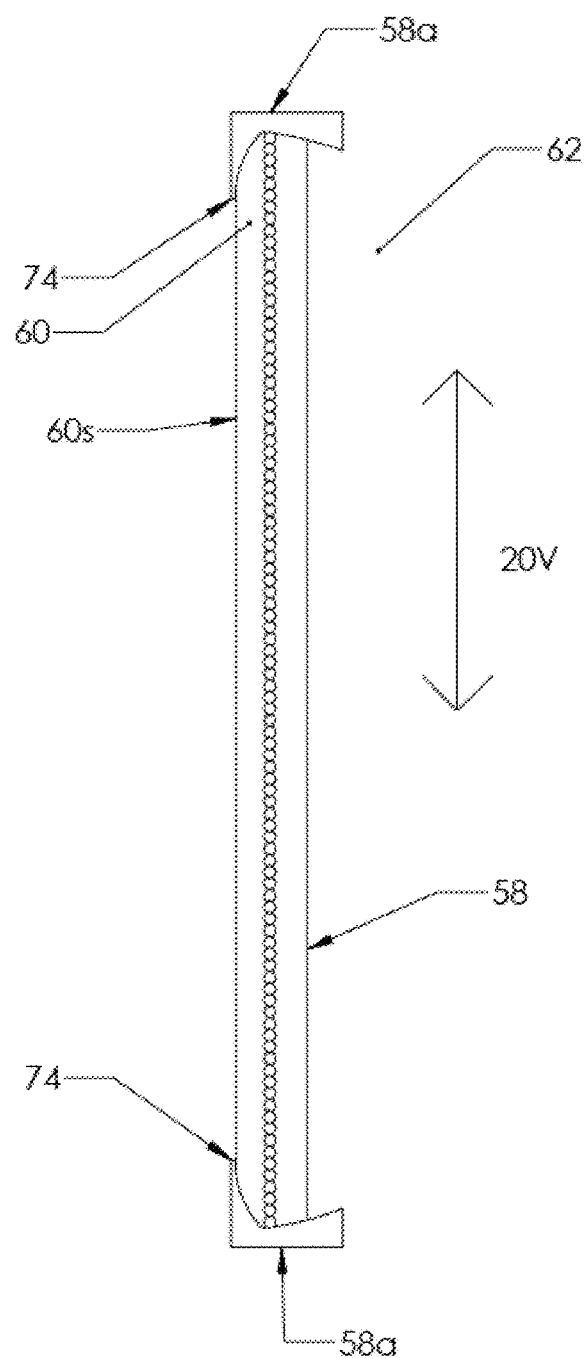
FIG. 3B is a side view of the mask plate shown in FIG. 3A.

FIGS. 3A and 3B illustrate an adjustable optically opaque mask plate 50 for an optical mask apparatus 75 according to an embodiment of the invention. In the illustrated example, the mask plate 50 comprises a series 52 of movable (e.g., sliding) opaque rods 54 adjoining one another along a plane, P, which is vertical with respect to the ground plane, G. The illustrated example addresses mitigation of brightness artifact in vertical regions of overlap $20_V$, occurring where image tiles $T_{i,j}$ in the same row $R_i$ overlap. Accordingly, the rods 54 are moveable along a horizontal direction perpendicular to the vertical regions of overlap $20_V$. This enables creation of an edge profile contour by adjusting individual rods 54 to form a series of steps which are variably spaced apart along the horizontal direction. In other embodiments the optical mask apparatus 75 may comprise mask plates 50 which mitigate brightness artifact in horizontal regions of overlap $20_H$, occurring where image tiles $T_{i,j}$ in the same column $C_j$ overlap, in which case the rods 54 are oriented for movement along a vertical direction perpendicular to the horizontal regions of overlap $20_H$. This enables creation of an edge profile contour by adjusting individual rods 54 to form a series of steps which are variably spaced apart along the vertical direction.

In the disclosed embodiments, the rods 54 are of uniform length, L, and are assembled in a generally parallel configuration along the rod lengths and along the plane, P. This enables parallel movement of the rods 54 and facilitates smooth movement of the rod ends to create or modify an edge profile contour.

The rods 54 are mounted between a front mask support plate 58 and a rear mask clamping plate 60 which are joined to provide a clamping support unit 62 that holds the rods in place for sliding movement along the plane, P. In this example design the rear mask clamping plate 60 is positioned against the rods 54 with fasteners, illustrated as set screws 64, that are adjustable to press the front and rear plates 58, 60 against one another with an initial pressure sufficient to hold the rods in position without preventing sliding movement of the rods alongside one another. The set screws 64 are adjustable to provide a modifiable clamping pressure against the rods 54. The rods 54 each have first and second ends 66, 68.

In the illustrated example, which addresses mitigation of brightness artifact in vertical regions of overlap $20_V$, the rods 54 extend along a common first (horizontal) direction $72_H$ in the plane, P, so that the first end 66 of each rod may contact another rod first end 66. Each rod 54, including the associated first rod end 66, includes a major surface 76 which extends in the first direction $72_H$. For the embodiment shown in FIG. 3, the rods 54 have cylindrical shapes, but may have a variety of other surface shapes. For example, the rods 54 may have rectangular-like shapes with flat or curved surfaces. Generally, first rod ends 66 of the rods 54 each have thickness width, W, measured along a second (vertical) direction $72_V$, along the plane P and perpendicular to the direction $72_H$. Each first rod end 66 defines a portion of an edge profile contour of the mask plate 50. The thickness width, W, of each rod end 66 is determinative of a minimum line adjustment resolution of a rod to articulate a portion of an edge profile contour shape.

During installation of the system 10 the rods 54 are moveable with respect to one another so that adjoining first rod ends 66 in a series 52 of the rods 54 provide an adjustable mask edge contour 70. With this capability, adjustment may be performed to provide an acceptable blocking mask edge contour, e.g., while viewing the blocking effects of the mask edge contour on the screen 14. Once a final contour is defined with the series 52 of rods 54, the set screws 64 are further tightened to lock the rods 54 in place. The manually defined edge contour provides a high contrast light blocking transition along one side of an image tile transition region. The selected contour can optimally prevent projector light from impinging on one side of a transition line or zone to mitigate duplicity of pixel data and thereby reduce or completely eliminate a brightness zone along one side of the transition line or transition zone in the region of image tile overlap 20.

The rods 54 are securable within the clamping support unit 62. The front mask support plate 58 is "U" shaped, having upper and lower ends 58a of sufficient length to each extend beyond and behind the rear plate 60. As shown in FIG. 3B, each of the front plate ends 58a includes a tab 74 which extends along the rear mask clamping plate 60 in spaced apart relation to the plate 60. Each of the tabs 74 includes a major surface parallel to a surface 60s of the rear mask clamping plate 60, through which a threaded hole 78 extends. One of the set screws 64 is threaded through each hole and against the rear support plate surface 60s to secure the series 52 of rods 54 in the support unit 62. The arrangement assures that the rods remain positioned between the front and rear plates 58, 60. The clamping support unit 62 includes a removable stop (not shown) adjacent each tab to maintain each set screw 64 against the surface 60s and prevent the screw from backing away from the surface 60s.

Each set screw 64 may be further advanced through a hole 78 to apply greater pressure against the rear plate surface 66s in order to prevent sliding movement of the rods 54 after the contour is defined. Thus the set screws 64 can be backed off as permitted by the stops (not shown) to reduce the pressure of the plates against the rods 54 to once more permit sliding movement of the rods; and the set screws 64 can then be advanced against the rear plate surface 66s to fix the rods 54 in positions. A layer of gasket material (not shown) can be positioned intermediate the entire series 52 of rods 54 and either one of the plates 58, 60 to provide a greater range of adjustment when applying pressure and to facilitate an even application of clamping pressure among all of the rods 54.

With the foregoing arrangement, under a condition of low clamping pressure the rods 54 may slide along the first direction $72_H$ and backward in an opposite direction. Such movement of the rods in opposite directions facilitates selectable definition of a customized profile for each of the mask plate edge contours 70. According to the invention, the edge contour 70 of each mask plate 50 is treated as an independent variable during installation while the resulting level of brightness artifact is a dependent variable. Edge profiles are varied to obtain acceptable transitions between adjoining image tiles 16. This is contrary to what is conventional: treating a minimized brightness level as an independent variable when exercising a model to define an edge contour profile.

The rods 54 illustrated in each series 52 are of similar size and complementary shapes along the contacting surfaces. The cylindrical shape of the rods 54, shown for one rod in FIG. 3C, and other shapes (e.g., rectangular) are suitable for creating continuous contact between adjoining surfaces. For the embodiment shown in FIG. 3, the rod bodies have appropriate tolerances to assure continuous contact between adjoining rod surfaces and minimize transmission of light from the projection beam through gaps between adjoining rods 54 of the mask 50. In other embodiments, contacting surfaces along the lengths of adjoining rods may include mating projections and notches, or other types of interdigitated relationships that inhibit light transmission between adjacent surfaces of the rods 54. There is essentially no leakage of light between the adjoining opaque rods. Similar function may be had with variations in the size, shape and uniformity of the rod features.

Figure 3C:
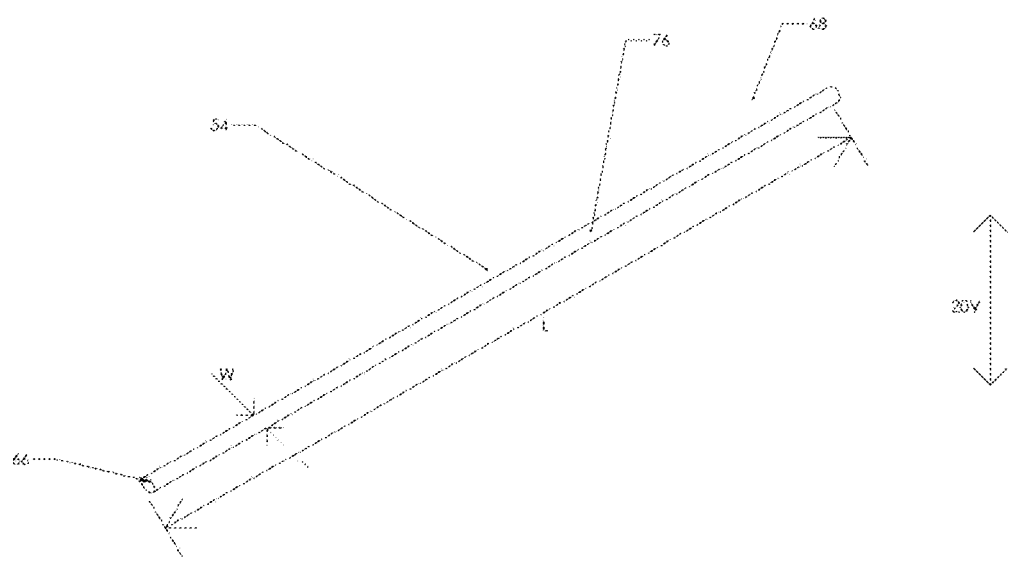
FIG. 3C illustrates an exemplary rod in the mask plate of FIGS. 3A and 3B.
Figure 4:
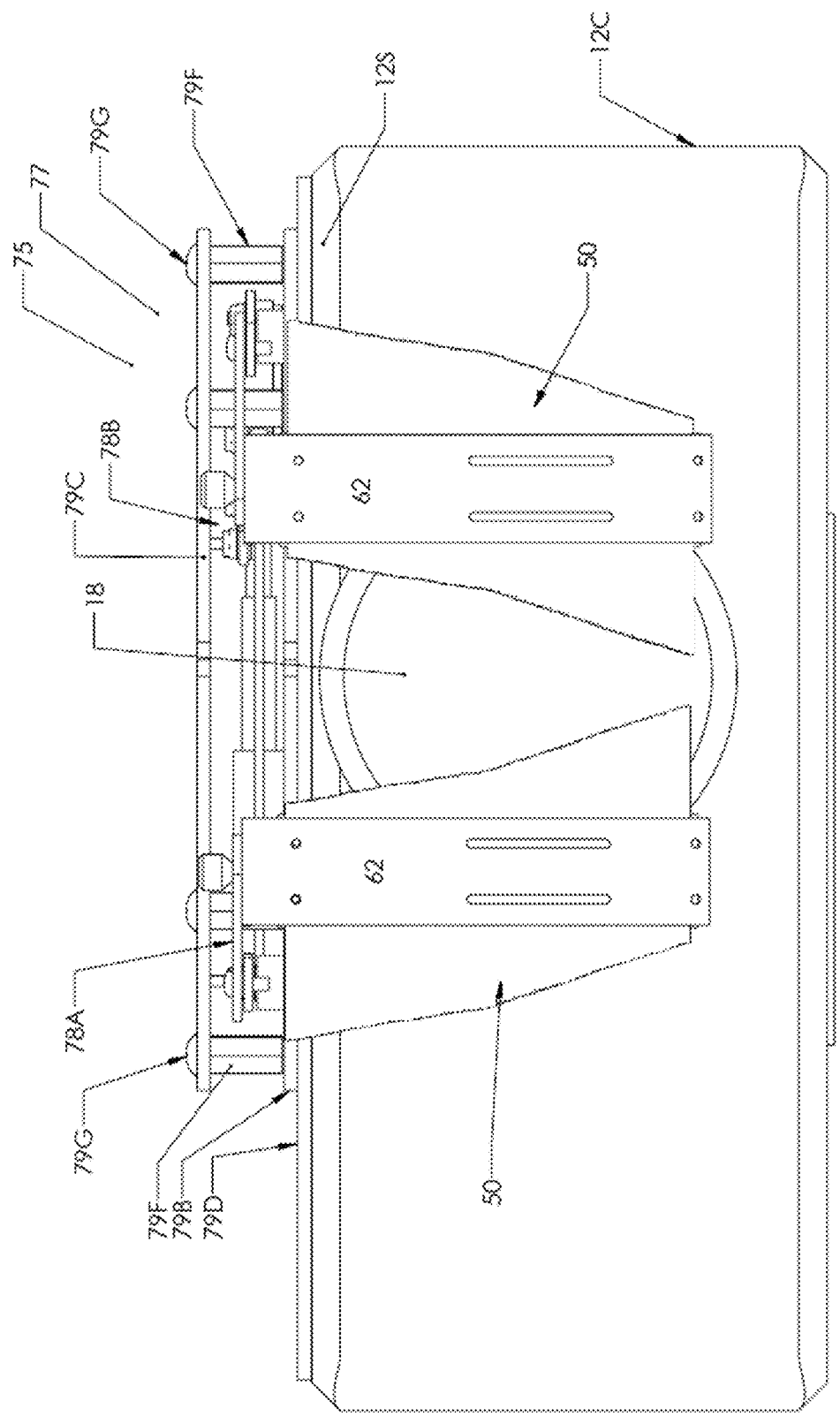
FIG. 4A is a front elevation view of the optical blocking mask apparatus mounted on a projector.
FIGS. 4B and 4C are partial perspective views of the optical blocking mask apparatus, illustrating a motorized positioning and adjustment frame installed on the projector shown in FIG. 4A.
FIGS. 4D and 4E are partial plan views of the motorized positioning and adjustment frame shown in FIGS. 4B and 4C, respectively.
FIG. 4F illustrates an exemplary rotatable joint between arm segments and an actuator arm in the motorized positioning and adjustment frame.
Figure 4:
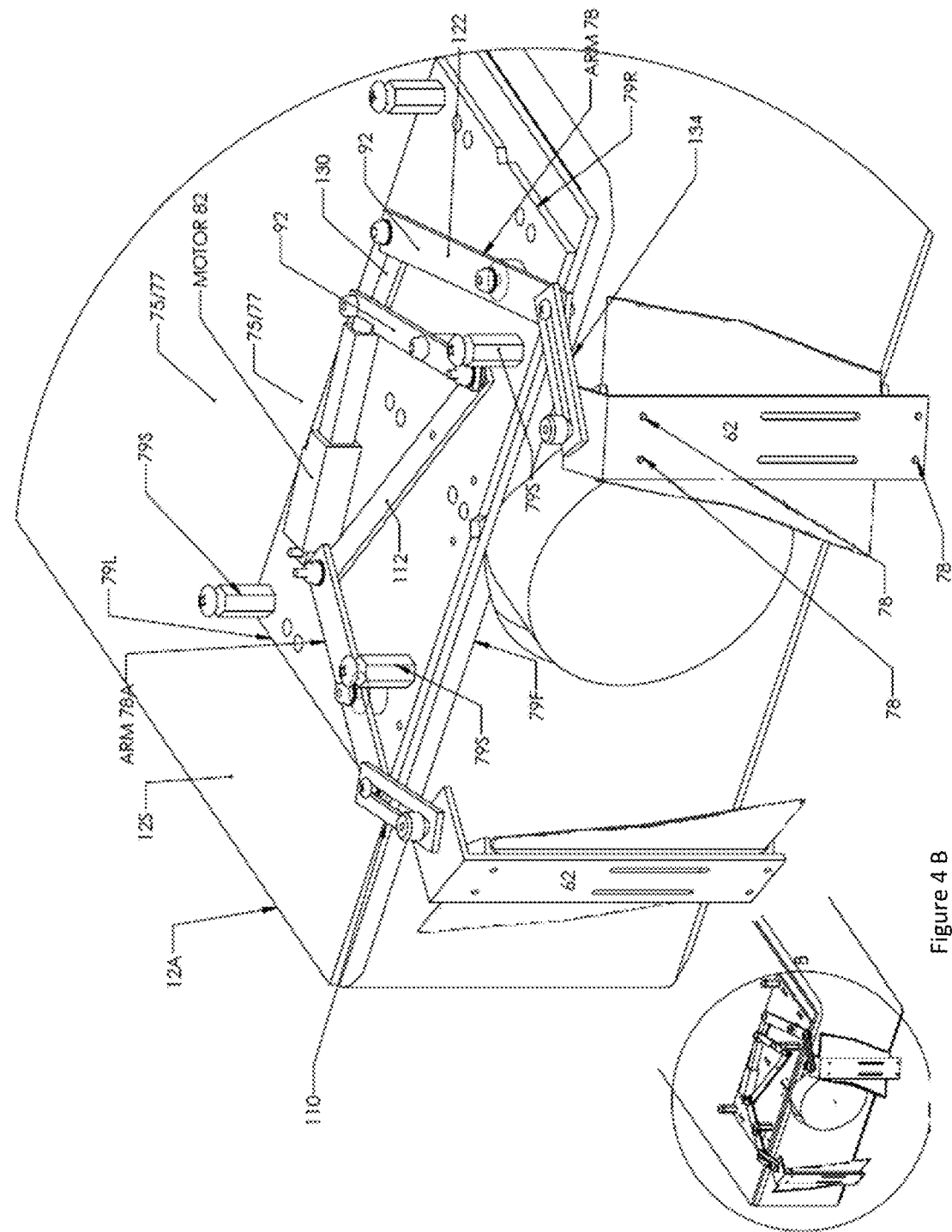
Figure 4:
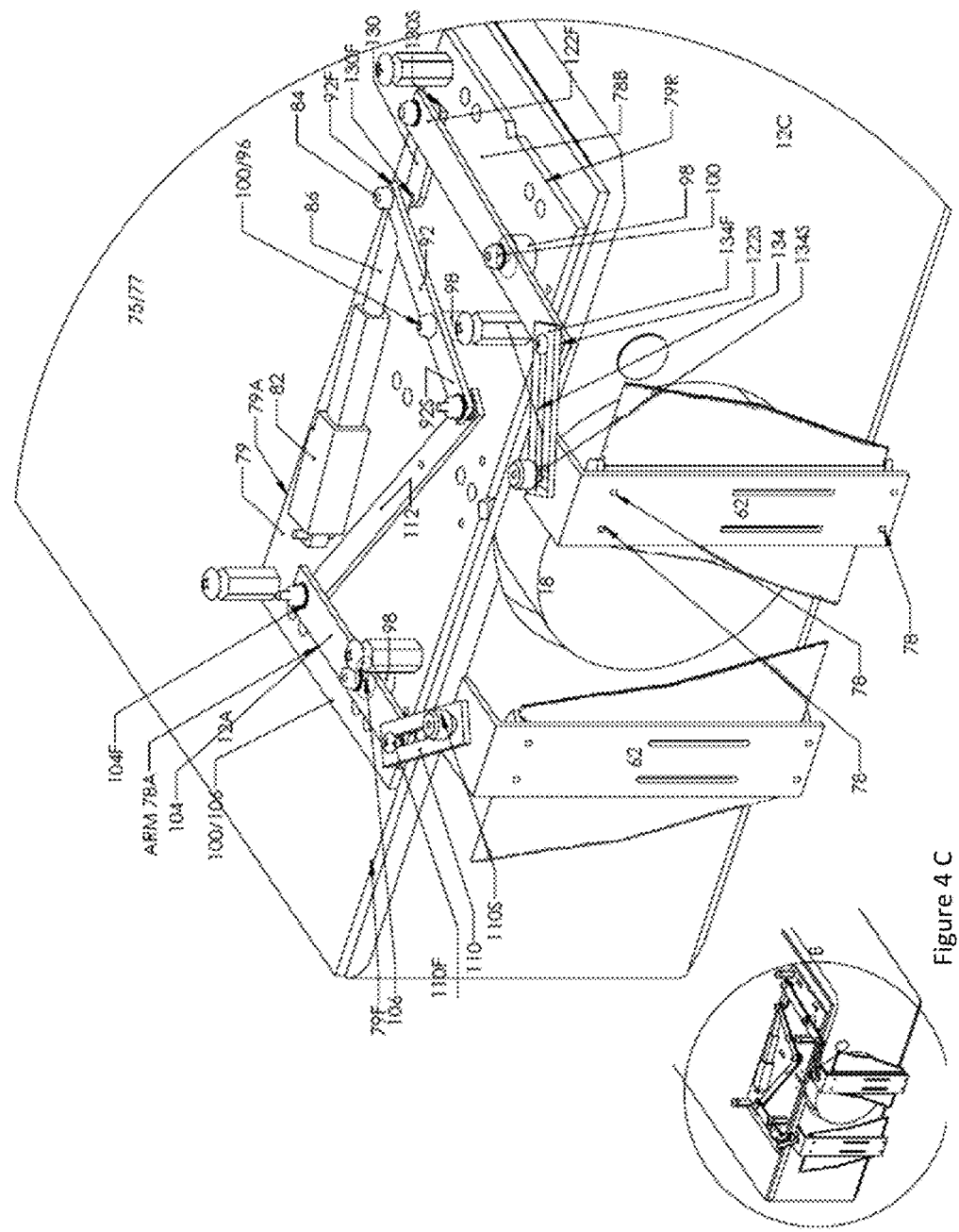
Figure 4:
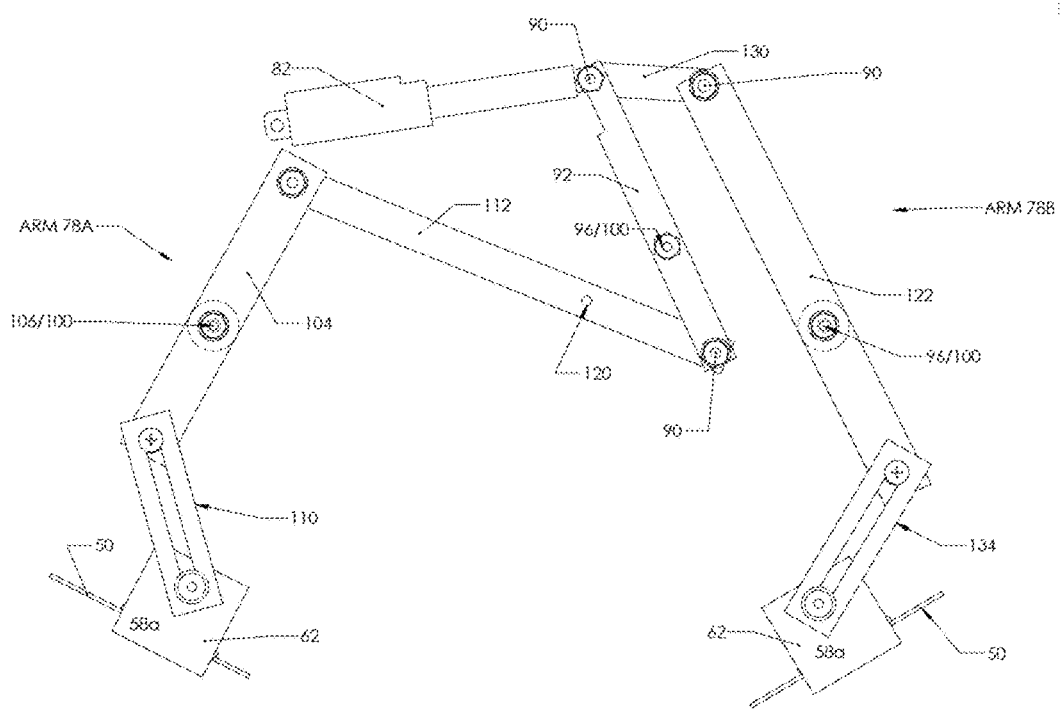
Figure 4:
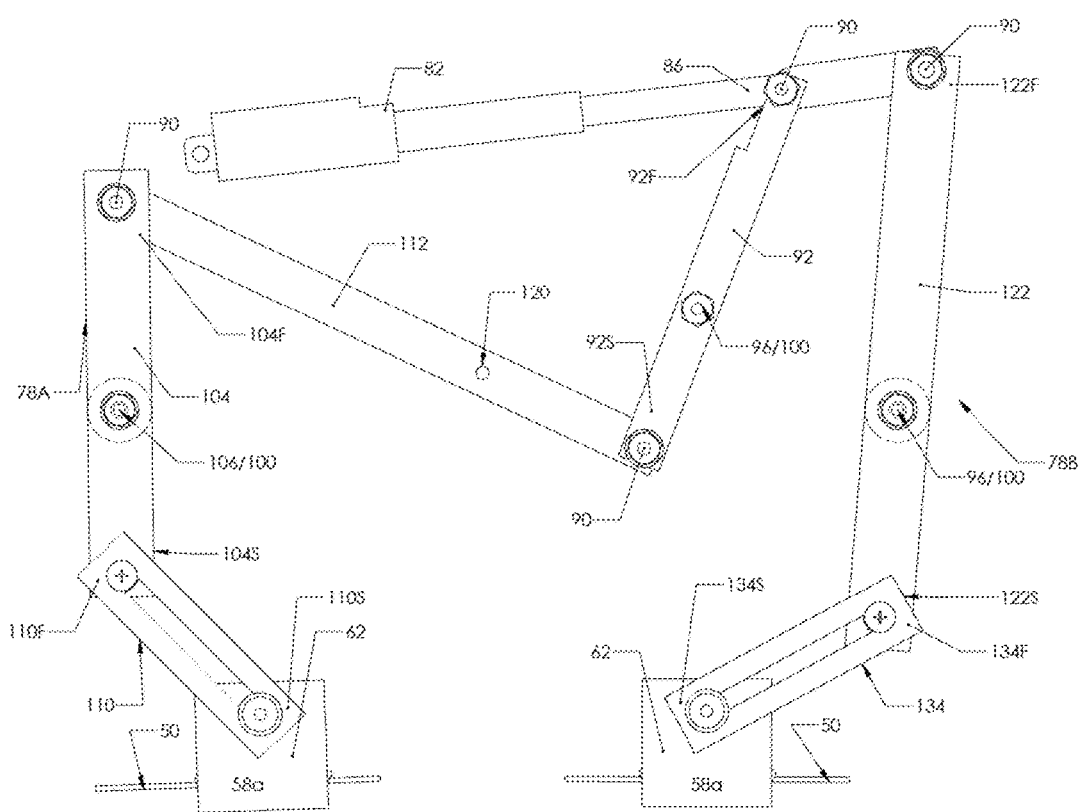

With reference to FIG. 4, the apparatus 75 includes a motorized positioning and adjustment frame 77 having two or more arms 78 which move the optically opaque mask plates 50 in front of the lens 18, e.g., when the system 10 projects a low light level scene. For each blocking mask plate 50, the front mask support plate 58 (shown in FIG. 3) is attached to a different one in a pair of arms 78A, 78B for simultaneous movement effected with one motor actuator 82. An exemplary linear actuator motor, model code L16-50-63-12-S (50 mm-63:1-12-S vdc) from Firgelli Technologies Inc. of Victoria, British Columbia. The motor 82 has a 50 mm actuator stroke and includes a limit switch when it reaches an end stop. As shown in the view of FIG. 4A, the frame 77 includes a chassis base 79B and a cover 79C between which the arms 78A, 78B and motor operate.

An optional intermediate adapter plate 79D is secured to the upper surface 12S of the projector case 12C, and the base 79B of the frame is secured to the adapter plate. However, the frame 77 may be fastened directly to the projector case. To provide clearance for operation of the arms and the motor, the chassis base 79B and the cover 79C are separated approximately 5 cm with gap spacers 79S. Fasteners 79G extend through the cover 79C, the gap spacers 79S, and the chassis base 79B to hold the frame together.

The arms 78A, 78B are each formed with multiple interconnected segments. Some pairs of arm segments are connected at pivot points for rotation during arm operation. Other pairs of arm segments are connected by fixed angle joints, i.e., joints which can be rotatably adjusted about pivot points during installation and then locked at desired angles between adjoining segments. This enables adjustment of the mask plates 50 relative to the beam path and distance from the lens 18. Still other arm segments are attached to the chassis base 79 of the frame 77 for rotation about a fixed position. The combination of segments rotating about a fixed chassis point with segments having a degree of rotational freedom (whether during adjustment or during operation of the arms 78A, 78B), enables simultaneous movement of the attached mask plates along optimal paths for insertion in a projection beam.

Two optical blocking mask plates 50 shown in FIGS. 4A(i) and 4A(ii) are mounted, via the clamping support units 62, in front of an exemplary projector 12a. The perspective views of FIGS. 4B and 4C show details of the positioning and adjustment frame 77 which includes a frame base 79 mounted to the projector 12a. The arms 78A, 78B and the adjustment frame motor 82 are mounted on the frame base 79 which is affixed along an upper surface 12S of the outer case 12C of the projector 12a.

The clamping support units 62 are each attached to a different arm 78A, 78B of the positioning frame 77. Each of the arms is moveable in a plane perpendicular to the plane, P, of each mask plate 50, shown in FIG. 3. Movement of the arms translates each of the mask plates along an path into or out of the light beam transmitted through the lens 18. In the example embodiment of FIG. 4, the motorized positioning frame 77 is shown positioned above the projector 12a.

The partial view of FIG. 4B illustrates the clamping support units 62 and the frame arms 78A, 78B moved into positions which place the two mask plates 50 outside the path of the projection beam sent through the lens 18. FIG. 4C illustrates the clamping support frame arms 78A, 78B in positions which place the mask plates 50 in the path of the projection beam transmitted through the lens 18. In FIG. 4B the actuator motor 82 is shown in a retracted position which places the clamping support units 62 farthest away from the lens 18. In FIG. 4C the motor 82 is shown in an expanded position with a leading end 86f of the motor actuator rod 86 fully extended, this positioning the clamping support units closest to the lens 18 and placing the mask plates 50 in the projection beam path. FIG. 4D is a partial plan view of the positioning and adjustment frame 77 shown in FIG. 4B with the actuator motor 82 in a retracted position. FIG. 4E is a partial plan view of the positioning and adjustment frame 77 shown in FIG. 4C with the actuator motor rod 86 fully extended.

The optical mask apparatus 75 may be under automated control to selectively mask image data sent from the projector 12a into two regions of overlap 20V when needed, e.g., when brightness artifact noticeably degrades the quality of the projected image. It is to be understood that the image tile created with the projector 12a forms regions of image overlap 20V with image tiles projected by two adjoining projectors in the same row as the projector 12a. In the example illustration of FIG. 4, the motorized positioning frame 77 is mounted over the projector case 12C, and an apparatus 75 is provided for each of the three projectors to remove duplicate pixel data in at least two regions of tile overlap with at least four mask plates 50.

In other embodiments, the motorized positioning frame 77 may also be mounted in other positions relative to the projector case 12C so that the arms 78A, 78B are positioned to move the mask plates vertically or horizontally. Numerous alternate configurations of the of the motorized frame are suitable to move the mask plates 50 into or out of regions of overlap 20V and or regions of overlap 20H created with two adjoining projectors in the same column or row as the projector 12a.

Thus, according to a method for removing duplicate pixel data, during installation of the system 10 a motorized positioning frame (e.g. the frame 77) is also mounted to each of two projectors 12 adjoining the projector 12a in the same row or column. Each frame 77 is adjusted to set a distance and orientation between an associated projector lens 18 and a mask plate 50. This defines an insertion path for optimum blocking of pixel data on one side of a tile transition. Embodiments of the frame 77 deploy one or multiple mask plates in front of a lens to initiate blocking of select pixel data from one or more adjoining regions 20V of tile overlap or one or more adjoining regions 20H of tile overlap. Generally, each frame 77 provides predefined, motorized movement of mask plates along an insertion path. The movement optimally positions the plates 50 for removal of artifact in one or multiple regions of overlap 20 surrounding each As shown in FIGS. 5C and 5D, exemplary image tile, e.g., with as many as four mask plates 50. Although not so limited, when the motorized positioning frame 77 is incorporated in the apparatus 75 to selectively insert the adjustable mask plates 50, edge contours 70 of the plates 50 can be adjusted with sufficient resolution to optimally enhance image quality under projector conditions of low brightness level.

The frame base 79 of the embodiment of the motorized positioning frame 77 illustrated in FIG. 4 is secured directly against the upper surface 12S of the projector outer case 12C, i.e., without an intermediate adapter plate 79D. Securement may be accomplished with, for example, fasteners or a clamping arrangement. The base 79 is shown centrally positioned about the projector lens 18 so that, when viewed from the front of a projector 12, the clamping support unit 62 of one blocking mask plate 50 is attached to the arm 78A along the left side of the lens and the clamping support unit 62 of another blocking mask plate 50 is attached to the arm 78B along the right side of the lens. The motor 82 is mounted along an aft side 79A of the base, and the clamping support units 62 extend beyond a fore side 79F of the base in front of the projector case 12C.

The leading end 86f of the motor actuator rod 86 is coupled to each of the arms 78A, 78B with a joint 88 that is rotatable in a plane parallel to the frame base 79. The motor actuator rod 86 is extendable in a direction toward the right side 79R of the base or retractable in an opposite direction toward the left side 79L of the base. The arm 78A includes a rotatable segment 92 having first and second opposing ends 92f, 92s. The segment 92 is mounted for rotation about the frame base 79 at a pivot point 96 between the segment ends 92f, 92s. The segment 92 is elevated for rotation above the frame base with a first spacer 98 positioned between the pivot point 96 and the base 79. A first threaded shaft 100 passes through the pivot point 96 and the first spacer 98 to secure the segment 92 to the frame base 79 while permitting rotation of the segment 92 about the pivot point 96. The segment 92 as well as other segments rotatable about the base 79 may be fastened to the base in a similar manner. For example, a lower end of the shaft 100 may be threaded into a blind aperture in the base and a fastening nut may be threaded on an upper end of the shaft. This arrangement secures the rotatable segment against the first spacer 98 and the base while permitting the rotational freedom.

Figure 4F:
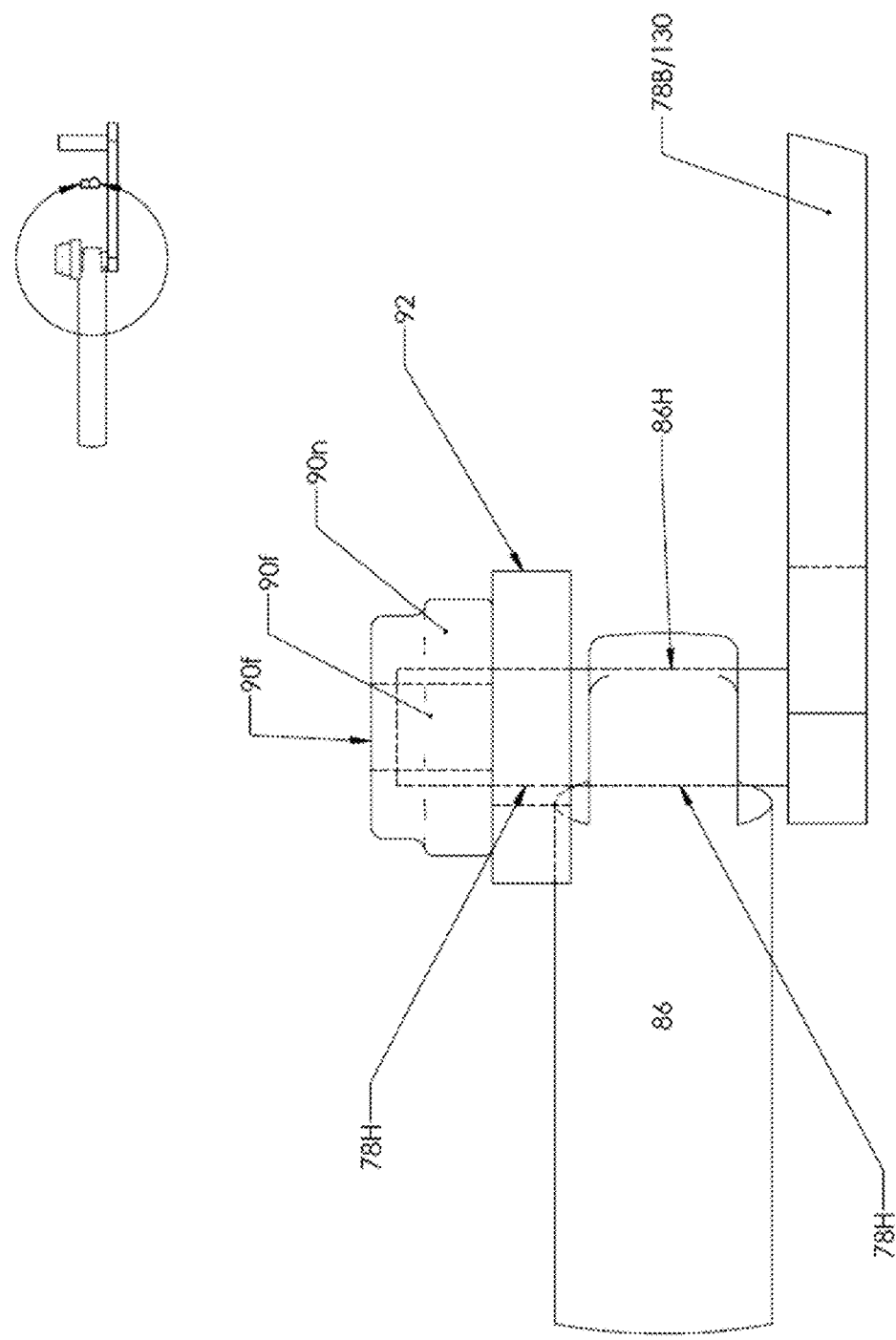

Referring also to FIG. 4F, the joint 90 formed with the actuator rod 86 comprises a threaded fastener 90f (e.g., a threaded shaft pressed into the segment 130) which passes through holes 78H, 86H and 78H formed in the arm 78A, the leading rod end 86f and the arm 78B, respectively. An opening corresponding to the hole 78H is not shown in the figure to indicate that the fastener 90f is a threaded shaft pressed into the segment 130. Generally, for the joint illustrated in FIG. 4F and other joints in the apparatus 75, when reference is made to a fastener, it is to be understood that fastening may be effected with a variety of means including, for example, the combination of a threaded rod and a nut, or a pressed fitting. The illustrated fastener 90*f* may be secured in place with a mating locking nut 90*n* shown positioned along the underside of the segment 130 of the arm 78B. The first end 92*f* of the segment 92 is thus rotatably attached to the leading end 86*f* of the motor actuator rod 86. As the motor actuator rod 86 extends or retracts, the first end 92*f* of the segment is both displaced along the base 79 and rotated with respect to the actuator rod 86. With this arrangement, as the rod 86 extends or retracts, the second end 92*s* of the segment 92 is displaced in a direction opposite from the direction of displacement of the first end 92*f*. Other rotatable joints 90 in the frame 77 (e.g., between arm segments 122 and 130) are similarly formed to the joint illustrated in FIG. 4F, but without inclusion of the actuator rod 86.

The arm 78A includes a second rotatable segment 104 having first and second opposing ends 104*f*, 104*s*. The segment 104 is mounted for rotation about the frame base 79 at a pivot point 106 between the segment ends 104*f*, 104*s*. In this example, the pivot point 106 is positioned along the left side of the lens 18 while the pivot point 96 is positioned along the right side of the lens. The segment 104 is elevated for rotation above the frame base with a second spacer 98 positioned between the pivot point 106 and the base 79. A second threaded shaft 100 passes through the pivot point 106 and the second spacer 98 to secure the segment 104 to the frame base 79. The segment 104 may be fastened to the base 79 in a manner similar to that described for the arm segment 92.

A coupling segment 112 of the arm 78A connects the first end 104*f* of the rotatable segment 104 for movement with the second end 92*s* of the rotatable segment 92. The connections between the coupling segment 112 and each of the segments 92 and 104 are rotatable joints 90. With this arrangement, when the second end 92*s* rotates about the pivot point 96 in a first direction (e.g., clockwise), the first end 104*f* rotates about the pivot point 106 in an opposite direction (e.g., counterclockwise), while the second end 104*s* rotates about the pivot point 106 in the second direction (e.g., also counter clockwise). Consequently, when the motor actuator rod 86 is extended, and thereby displaced in a direction toward the right side 79*r* of the base, the second end 104*s* is also displaced in a direction toward the right side 79R of the base.

Similarly, when the motor actuator rod 86 is retracted, and thereby displaced in a direction toward the left side 79L of the base, the second end 104*s* is also displaced in a direction toward the left side 79L of the base. The clamping support unit 62 of a mask plate 50 may be attached directly to the second end 104*s* of the second rotatable segment 104, or may be connected thereto through the illustrated coupling segment 110, having first and second opposing ends 110*f*, 110*s*. As illustrated in FIG. 4, both the connecting point between the second end 104*s* and the coupling segment first end 110*f*, and the connecting point between the clamping support unit 62 and the coupling segment second end 110*s*, are rotatably adjustable and lockable to fix the angle between the coupling segment 110 and the second end 104*s* and to fix the angle between the coupling segment 110 and the clamping support unit 62.

The arm 78B includes a rotatable segment 122 having first and second opposing ends 122*f*, 122*s*. The segment is mounted for rotation about the frame base 79 at a pivot point 126 between the segment ends 122*f*, 122*s*. The segment 122 is elevated for rotation above the frame base with a third spacer 98 positioned between the pivot point 126 and the base 79. A third threaded shaft 100 passes through the pivot point 126 and the third spacer 98 to secure the segment 122 to the frame base 79. The segment 122 may be fastened to the base 79 in a similar manner to that described for the segment 92 of the arm 78A, with a lower end of the shaft 100 threaded into a blind aperture in the base and a fastening nut threaded on an upper end of the shaft to secure the rotatable segment 122 against the third spacer 98 and the base while permitting the rotational freedom of the segment 122.

An arm coupling segment 130, comprising first and second opposing ends 130*f*, 130*s*, connects the first end 122*f* of the rotatable segment 122 in spaced-apart relation to the actuator rod 86. The spacing provided by the coupling segment 130 avoids interference between the first end 92*f* of the rotatable segment 92 and the first end 122*f* of the rotatable segment 122. The first end 130*f* of the coupling segment 130 is rotatably attached to the leading end 86*f* of the motor actuator rod 86.

The second end 130*s* of the coupling segment 130 is rotatably attached to the first end 122*f* of the rotatable segment 122. As the rod 86 extends or retracts, the first end 130*f* of the coupling segment is both displaced along the base 79 and rotated with respect to the actuator rod 86. Also, as the rod 86 extends or retracts, the first end 122*f* of the rotatable segment 122 is displaced along the base 79 toward the right side 79R of the based, and is rotated with respect to the coupling segment 130. With this arrangement, as the actuator rod 86 extends or retracts, the second end 122*s* of the segment 122 is displaced in a direction opposite from the direction of displacement of the first end 122*f*, toward the left side 79L of the base.

The clamping support unit 62 of a mask plate 50 may be attached directly to the second end 122*s* of the second rotatable segment 122, or may be connected thereto through the illustrated coupling segment 134 having first and second opposing ends 134*f*, 134*s*. As illustrated in FIG. 4, both the connecting point between the second end 122*s* and the coupling segment first end 134*f*, and the connecting point between the clamping support unit 62 and the coupling segment second end 134*s*, are rotatably adjustable and lockable to fix the angle between the coupling segment 134 and the second end 122*s* and to fix the angle between the coupling segment 134 and the clamping support unit 62.

In accord with one method for removing duplicate pixel data, for each of the projector 12*a*, and an adjoining second projector 12 in the same row or column, a mask plate 50 is adjustably mounted on the moveable frame support arms 78 of an adjustment frame 77 mounted on the projector. When each in a different pair of mask plates 50 (i.e., plates associated with different projectors) is moved into a different beam path, each series of rods 54 is located, relative to each associated lens 18, within an adjustment range to articulate a customized contour 70 with the rods. Screen zones containing artifact of high brightness levels, due to duplicative pixel data, are identified in each of two regions 20 of image tile overlap. With these zones identified for brightness reduction, and with the motorized frame of each projector 12 positioned to place the two series 52 of rods 54 into the beam path to adjust two mask plate contours 70, each mask plate contour 70 is adjusted to project a suitable blocking mask transition line 84 in one screen region of image tile overlap created with (i) the image tile cast by the projector 12*a* and (ii) the image tile cast by the adjoining projector.

FIG. 2C is a simplified partial schematic view illustrating an exemplary transition line 84 within a transition zone 85. The line and the zone are positioned on the screen 14 between an image tile $T_{2,2}$ created by the projector 12*a* and an image tile $T_{2,3}$ created by an adjoining projector in the same row. The relative sizes of the image tiles and the transition zone 85 are not drawn to scale. Further, shapes and slopes of transition lies 84 and transition zones 85 may vary. In the example illustration of FIG. 2C there may be a single transition line 84, e.g., resulting from optimal alignment of edge contours to completely eliminate duplicate pixel data. However, it is to be understood that mask plates associated with adjoining projectors in the same row or column may present two non-parallel and spaced-apart transition lines which result in a transition zone 85 such as illustrated in the figure. FIG. 2E illustrates a sequential transition from (i) a screen region of image tile overlap 20 prior to insertion of mask plates 50, to (ii) creation of a transition zone 85 by initial, suboptimal, placement of mask plate edge contours 60 in the beam paths of two adjoining projectors, to (iii) creation of a continuous image transition across adjoining tiles resulting in a single transition line 84, effected with an optimal adjustment of mask plate rods 54.

The borders of the transition zone are defined by mask plate edge contours on different projectors which contours may not be parallel to one another. The edges of the transition zones may be along borders of brightness zones which would otherwise appear due to unmasked pixel overlap. Because there may be a single transition line (e.g., line 84) or a transition zone (e.g., zone 86) the term "transition" as used herein generally refers to a line of transition or a zone of transition resulting from placement of edge contours 60 of mask plates 50 in the beam paths of adjoining projectors. Summarly, with each of the adjoining projectors having an optical mask apparatus 75 comprising a mask plate 50, the associated edge contours 60 block portions of different projection beams to define a transition between adjacent tiles. In regions of image tile overlap 20 (i.e., overlap regions), this results in a transition between projection of just one or just the other in the pair of overlapping image tiles. In an optimal deployment of the projection system, there is little or no duplicate (overlapping) pixel data projected along the transition.

Initially, the contours 70, each defined by a series of rods 54, may be a straight line which projects a line on the screen 14 along with brightness artifact. According to the method for removing duplicate pixel data, the first rod ends 66 in each of two series of rods 54 are articulated along the direction $72_H$ to define a transition line 84.

Unlike a conventional mask plate, each custom contour 70 of the mask plates 50 is created by defining and adjusting a projected transition line 84 on the screen 14 in the associated region of image tile overlap. Accordingly, the rod first ends 66 in each series 52 are articulated while casting beams onto the screen 14 from the projector 12a and the other projector which creates the adjoining tile in the associated region of image tile overlap 20. The adjustment varies positions of the rod first ends 66 until the identified zones containing artifact of high brightness levels are reduced or completely removed.

The foregoing illustrates use of two adjustable mask plates 50, each mounted on a different projector, to block light within a region of image tile overlap 20, i.e., between a pair of image tiles created by two adjoining projectors 12. The mask plates are articulated on-site to define a transition between the image tiles that reduces brightness artifact. The process of defining the transition defines the mask plate contours 70. During system operation the pairs of projected contours 70 define the transition between the adjoining tiles to remove pixel data which would otherwise be cast into each adjoining region of image tile overlap 20. Each defined transition can substantially or completely prevent duplicate projection of pixel information by multiple projectors into a region of image tile overlap 20. The method for on-site selection of a transition line 84 or transition zone 85, by varying the rod positions on the masks 50, can render unnecessary all computer aided design to specify blocking mask edge contours 60. By eliminating computer aided efforts to design or modify mask edge contours 60 there is a reduction in system development time and time required to complete adjustments that improve quality transitions between adjoining image tiles during system installation.

With the rod first ends 74 being moveable in the first direction $72_H$, the process of defining the contours 70 is effected by viewing changes in brightness artifact on the screen 14. Projection of one or more contours 70 on the screen 14 defines a transition line 84 or transition zone 85 as a border along which light in a projection beam is blocked from striking the screen when one or more mask plates 50 are positioned in front of the lenses 18 which cast the adjoining image tiles.

Each in a plurality of the rod first ends 74 includes an edge surface 88 such as shown in FIG. 3D. For the disclosed embodiments, the term "edge surface" refers to the surface of a rod end 66 along which a major surface 76 of the rod 54 terminates. An edge surface, e.g., a surface 88, may not be a part of the rod major surface 78. In the illustrated embodiment the major surface 76 corresponds to the cylindrical rod shape, and the edge surface 88 is a flat contour having a circular shape along the edge of the first rod end. More generally, the edge surface 88 extends in a plane that intersects an adjoining major surface 76 which may be of various shapes, such as one of four sides in a rectangular rod. With each rod end 66 interposed in the projection beam, each edge surface 88 defines one in a plurality of segments 94 in a transition line 84 or transition zone 85 based on variable positioning of the rod end. See FIG. 2D.

With the adjoining rods 54 in each mask plate 50 held in a sequence by the associated clamping support unit 62, imposition of the edge surfaces 88 in the projection beam results in projection of a contiguous series of segments 94 which define a transition between pixel data from adjoining image tiles on the screen. That is, the segments 94 projected from one or more masks 50 collectively define the transition line 84 or transition zone 85. See FIG. 2C. In this embodiment each of the several rod first ends 74, including the associated edge surfaces 88, has a uniform thickness dimension, d, as measured in a second (vertical) direction $72_V$ perpendicular to the first direction $72_H$ and parallel to the plane, P. When the rods 54 are formed with cylindrical shapes as shown in FIG. 3C, the thickness dimension corresponds to the outside diameter, D, of the cylindrical rod as well as the width, W.

To reduce or minimize light scattering, the edge surfaces 88 may have relatively uniform and flat shapes resulting in a minimum path length, p, across each surface. Ideally, with the shortest path between opposing edges along a surface 88 conforming to a straight line, the edge surfaces 88 of the rods 54, formed as the cylindrical bodies 54c shown in FIG. 3C, are flat surfaces which extend only in planes, $P_V$, that mat intersect an adjoining major surface 76 when a contour is defined. The planes $P_V$ are perpendicular to the plane, P, and parallel to the direction $72_V$. With this configuration, and with the masks 50 positioned substantially perpendicular to the optical axis of the associated projector 12, the flat shapes of the surfaces 88 may impart a relatively low level of light scattering into the region of image tile overlap 20. This low level of scattering associated with use of the illustrated embodiments to form blocking masks is to be compared with relatively high levels of intended light scattering created with blend plates that mix light in a blend zone. The disclosed embodiments of the invention do not require light scattering, blend plate functionality or mixing of light to reduce peak brightness levels. The disclosed embodiments primarily function to block portions of projection beam light while any presence of scattered light is incidental, creating a secondary effect.

The embodiment of a motorized positioning and adjustment frame 77 illustrated in FIG. 4 has a pair of arms 78 which move a pair of mask plates 50 in front of a projector lens 18, it being understood that with two adjoining projectors, each comprising a motorized positioning and adjustment frame 77, one of the plates 50 in each frame 77 is used to block light from two lenses impinging on the same vertical screen region 20V of tile overlap. In other embodiments a vertical region 20V of tile overlap or a horizontal region 20H of tile overlap may be at an end of an image tile row $TR_i$ or column $TC_j$, only requiring that the frame 77 deploy one mask plate in one region of overlap 20V or 20H. In still other embodiments three or even four regions of overlap may surround an image tile $T_{ij}$.

For another embodiment illustrated in FIG. 5, the apparatus 75 includes a motorized positioning and adjustment frame 77 having three arms 78: two arms 78A and 78B which move two of the mask plates 50 in front of the lens 18 to block light in two vertical screen regions 20V of tile overlap on opposing sides of an image tile $T_{ij}$; and a third arm 78C which controls operation of a mask plate adjustment assembly 144 to selectively move a third mask plate 50' in front of the lens 18 to block light in one horizontal screen region 20H of tile overlap on one side of the image tile $T_{ij}$. In this example, the third mask plate is referred to as mask plate 50', but it may be of identical design and function as each of the two mask plates 50 that are moved with the arms 78A and 78B. The mask plate adjustment assembly 144 includes an angle adapter bracket 146 and an adjustable reach bracket 147 connected between a double jointed assembly 148 and the clamping support unit 62 of the mask plate assembly 50'. The angle bracket provides an appropriate angle of the mask plate 50' relative to the projection beam. The reach bracket 147 is slotted to enable adjustment, with conventional fasteners, of the effective length and, therefore, the extent to which the mask plate assembly 50' can enter into the path of the projection beam to remove pixel data otherwise cast in a region of overlap.

The third arm 78C has first and second opposing ends 78f, 78s. The first end 78f of the third arm 78C is pivotally attached about a point 120 along the coupling segment 112 to form a rotatable joint 90 (similar in function to the rotatable joints 90 between the coupling segment 112 and each of the segments 92 and 104). The second end 78s of the third arm 78C is rotatably coupled to the double jointed assembly 148 which, in turn, is connected to displace the clamping support unit 62 of the blocking mask plate 50' via movement of the angle adapter 146 and the reach bracket 147.

Movement of the third arm 78C causes movement of the double jointed assembly 148 which causes movement of the clamping support unit 62. See, also, FIGS. 5C and 5D.

Movement of the third arm 78C in response to motor action is constrained to a plane P' parallel to the base 79. As the arm 78A is displaced by movement of the motor 82, the resulting rotation of the arm 78C causes the mask plate 50' to move into or out of the path of the projection beam. In the illustrated embodiment, this selectively positions the third mask plate 50' to block pixel data projected on the horizontal screen region 20H above an image tile $T_{ij}$ while the other mask plates 50 are positioned to block pixel data projected on the two vertical screen regions 20V on opposing sides of the same image tile $T_{ij}$.

Figure 5A:
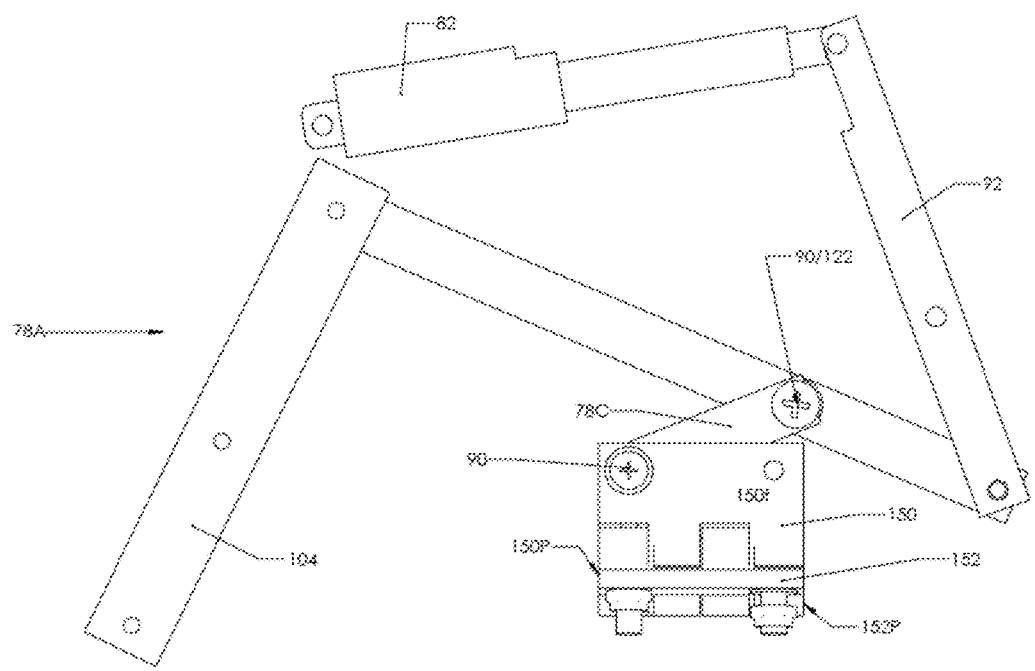
Figure 5B:
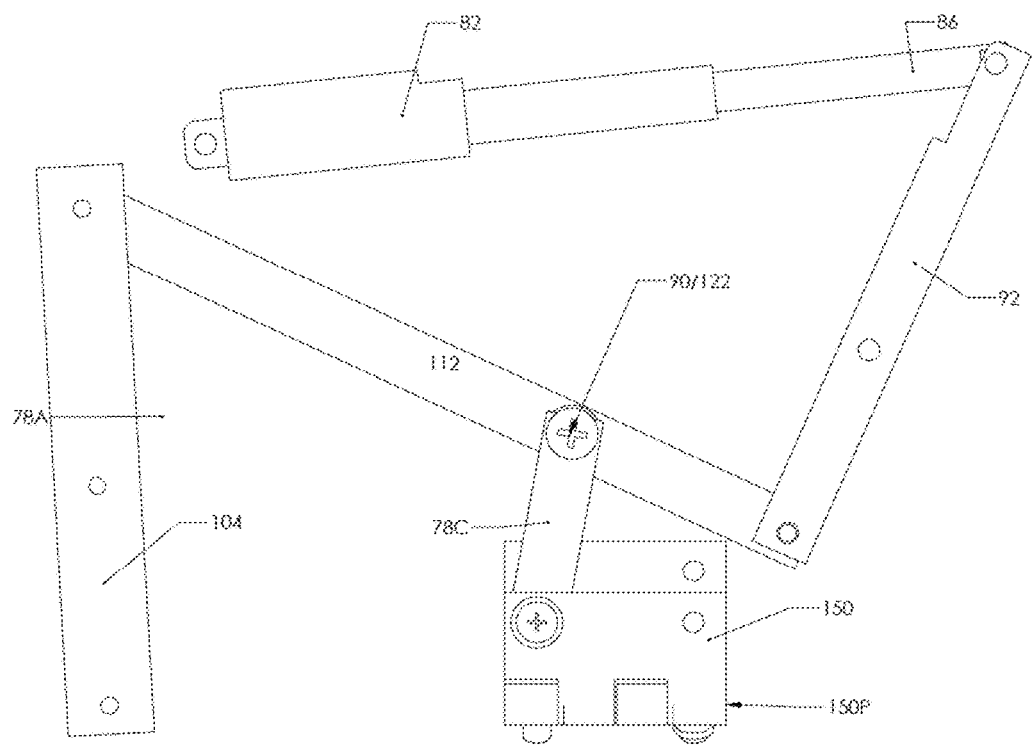
Figure 5C:
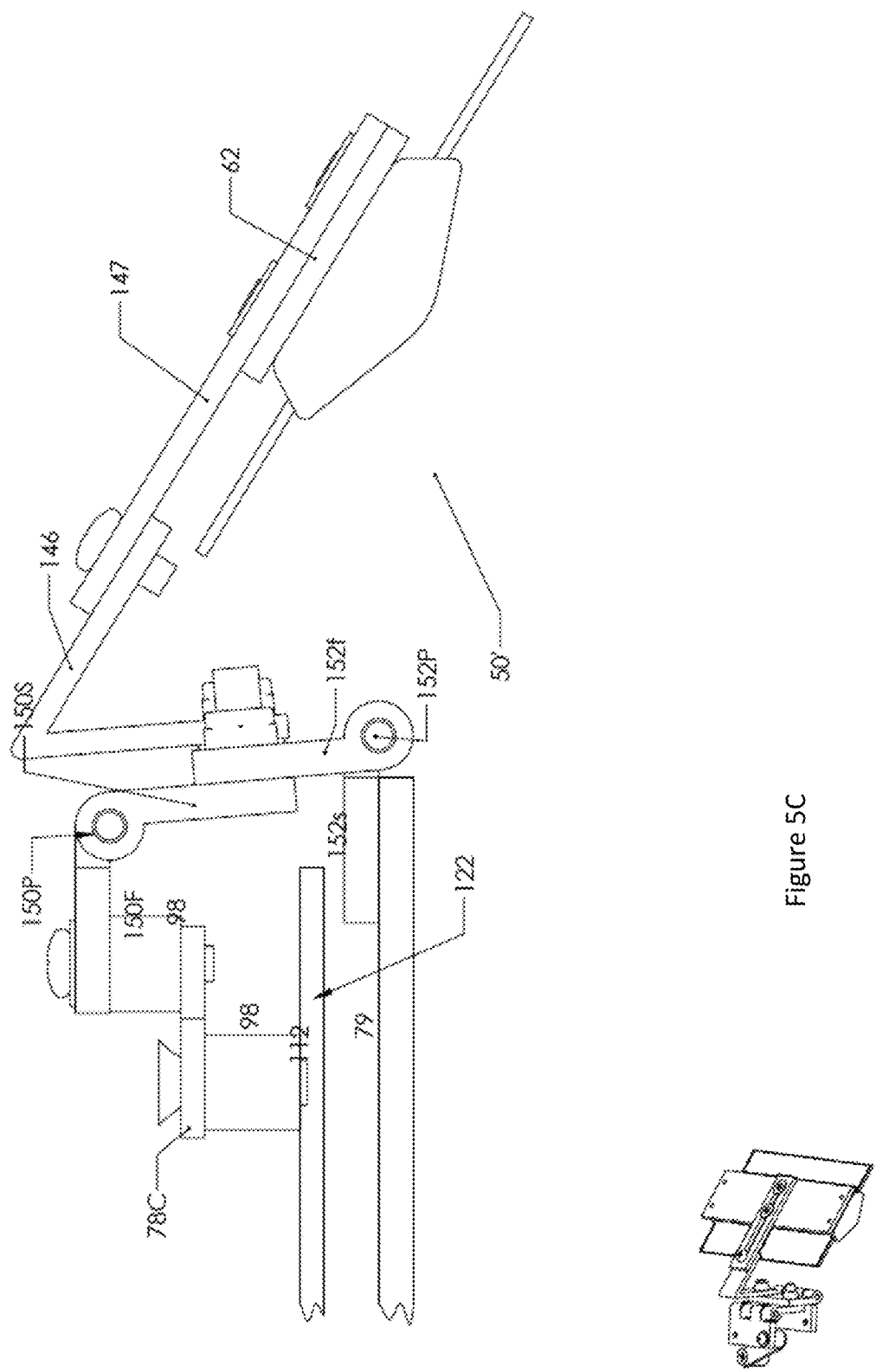
Figure 5D:
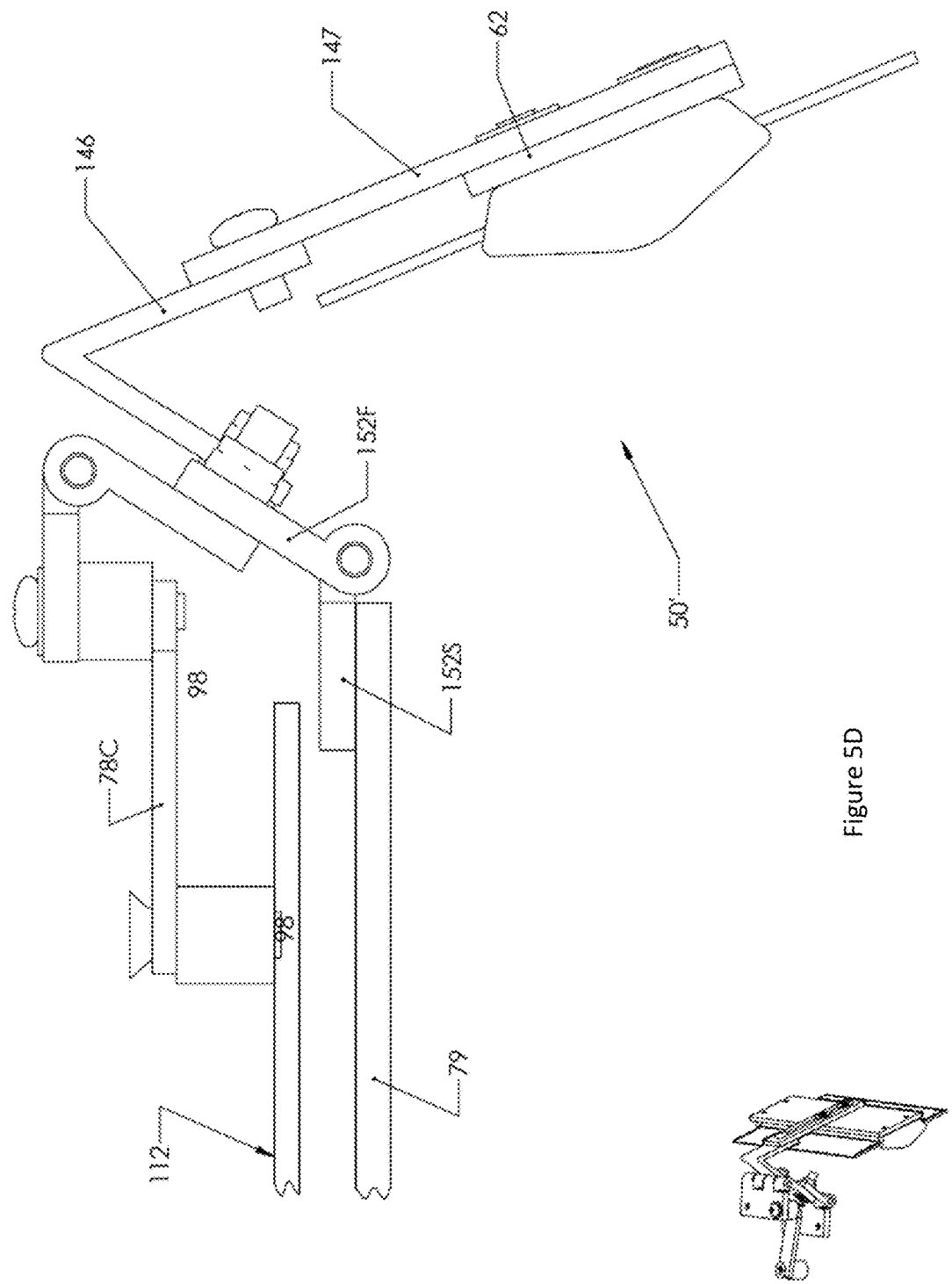

Referring to the partial plan view of FIG. 5A, the positioning and adjustment frame 77 is shown with the actuator motor 82 in the retracted position as also shown in FIG. 4D. This positions the mask plate 50' out of the projection beam path. In the partial plan view of FIG. 5B, the positioning and adjustment frame 77 is shown with the actuator motor 82 in the extended position as also shown in FIG. 4E. This positions the mask plate 50' in the projection beam path to block pixel data in a horizontal screen region 20H.

In one embodiment the double jointed assembly 148 is an assembly of two interconnected hinges 150, 152. The hinges may comprise metal or non-metallic materials. As is conventional for many hinge designs, for each hinge the edges of the hinge plates abutting one another include integrally formed portions of a hinge barrel through which a hinge pin passes. As shown in FIGS. 5C and 5D, a first hinge 150 comprises first and second plates 150f, 150s connected by a pin 150p. A second hinge 152 comprises first and second plates 152f, 152s connected by a pin 152p. The second plate 152s of the second hinge 152 is stationary with respect to the frame 77 by being secured to the base 79 with threaded fasteners and nuts.

The second plate 150s of the first hinge 150 and the first plate of the second hinge are fixedly attached to one another in a parallel configuration so that the axes of rotation of the hinges about the associated pins are parallel. As the second plate 150s rotates about the pin 150, the second plate 150s also rotates about the pin 152p with rotation of the first plate 152f. Attachment of the plates 150s and 152f to one another can be effected with fasteners, weld joints or adhesive bonding.

The first plate 150f of the first hinge 150 is pivotally attached to the second end 78s of the third arm 78C to form a rotatable joint 90 about which the third arm 78C can rotate as the arm 78A is displaced by movement of the motor 82. The coupling arrangement between the segment 112 of the arm 79A and the second plate 150s includes a spacer 98 positioned between the segment 112 and the arm 78C and another spacer 98 positioned between the arm 78C and the second plate 150s. The attachment of the first hinge plate 150f to the arm 78C also constrains movement of the first hinge plate 150f to facilitate application of a force from the motor 82 that results in rotation of the plates 150s and 152f about the pins 150p, 152p. The associated joint 90, about which the third arm 78C rotates in response to the applied motor force, permits vertical displacement of the third arm 78C. This enables orientation of the arm to change from a disposition substantially parallel with the base 79 (e.g., when the plates 150s, 152f are vertical positioned) as shown in FIG. 5C, to a sloped orientation. The sloped orientation results when the plates 150s, 152f rotate about the pin 152p, causing the pin 150 to occupy a somewhat lower height above the base 79.

With movement of the first plate 150f controlled by movement of the third arm 78C, constrained to a horizontal plane, and with the parallel plates 150s and 152f secured to one another, movement of the third arm 78C causes rotation of both hinge pins 150p and 152p so that both plates 150s and 152f rotate together about the lower pin 152p. This movement causes the hinge plates 150s, 152f to rotate between a vertical orientation (perpendicular to the base 79) as shown in FIG. 5C and a canted orientation as shown in FIG. 5D.

Figure 5E:
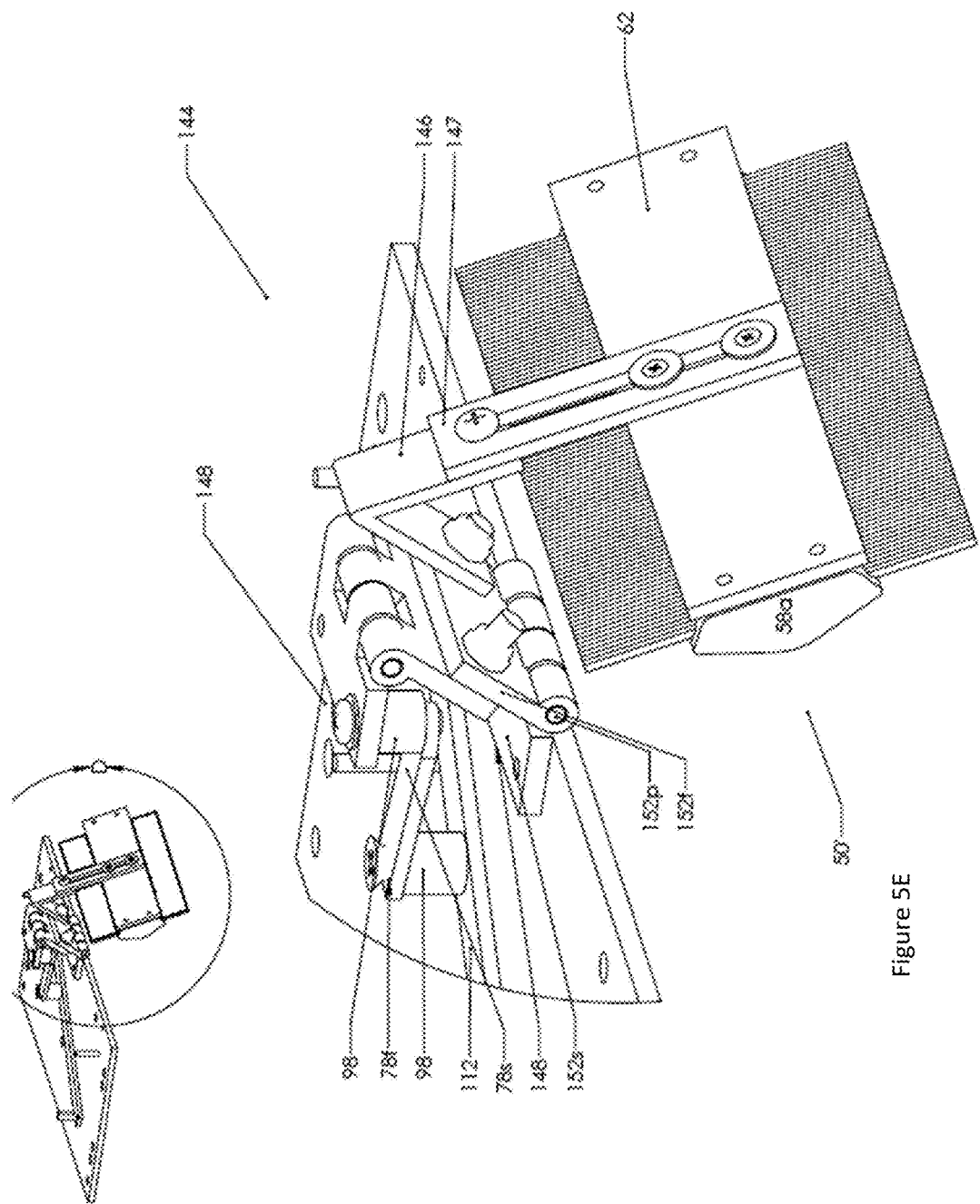

As shown in FIGS. 5C and 5D, exemplary fasteners 160, used to secure the plates 150s and 152f together, also fasten the angle adapter 146 to the plates 150s and 152f. FIG. 5E further illustrate attachment of the mask plate 50', the clamping support unit 62, the angle adapter 146 and the double jointed assembly 148 to the third arm 78C.

While the apparatus 75 may be designed with arms in a variety of sizes, exemplary lengths of individual connecting segments of the arms 78A, 78B, 78C, exemplary positions of pivots and exemplary dimensions of other hardware components are provided to more fully illustrate embodiments. Lengths of the segments, measured as distances between joints, are as follows.

rotatable segment 92: 115 mm;
coupling segment 112: 110 mm;
rotatable segment 104: 110 mm;
coupling segment 130: 45 mm;
rotatable segment 122: 160 mm;
arm 78C: 43 mm;
coupling segments 110 and 134: 63 mm.

The illustrated coupling segments 110 and 134 are slotted to facilitate adjustment of the distance of each mask plate 50 from the lens 18. The length of each slot is 63 mm.

Positions of the rotatable joints 90 (about the pivot points 96) are as follows.
for the rotatable segment 92: 45 mm from the joint with coupling segment 112;
for rotatable segment 106: 50 mm from the joint with coupling segment 112;
for the rotatable segment 122—100 mm from the joint with coupling segment 130;

The hinge plate 150f, measured from the center of the pin 150P, and along the direction of the projection beam, is 25 mm. The angle adapter 146 has an internal angle of 50 degrees to 60 degrees (e.g., 55 degrees). The reach bracket 147 includes a slot enabling an adjustment range up to about 7 mm (based on the length of the slot), in a direction set by the angle adapter 146.

There has been illustrated a positioning and adjustment frame 77 comprising a pair of arms 78A, 78B which move two mask plates 50 in front of the lens 18 to block light in two vertical screen regions 20V of tile overlap on opposing sides of an image tile $T_{ij}$. A third arm 78C has been illustrated which moves a third mask plate 50' in front of the lens 18 to block light in one horizontal screen region 20H of tile overlap along an upper side of the image tile $T_{ij}$. In these examples the frame base 79 is attached along an upper surface 12S of a projector outer case 12C. It will be apparent to those skilled in the art that the positioning and adjustment frame 77 can be modified for attachment along an underside of a projector outer case 12C so that the third arm can move a third mask plate 50' in front of the lens 18 to block light in one horizontal screen region 20H of tile overlap along a lower side of an image tile $T_{ij}$. Thus, in a column comprising at least first and second upper and lower projectors, which together create a horizontal screen region 20H of tile overlap, the lower projector may have the positioning and adjustment frame 77 attached along an upper surface 12S of the projector outer case 12C, while the upper projector may have the positioning and adjustment frame 77 attached along the underside of the projector outer case 12C. With such an arrangement, the overlapping pixel data in one horizontal screen region 20H, generated by two adjacent projectors in the same column, can be removed by optimal adjustment of the mask plate 50' in each of the third arms 78C. In still other embodiments, the clamping support unit 62 and mask plate 50' illustrated in conjunction with the third arm 78C can be operated for movement in and out of the projection beam path with a separate motor 82 in combination, for example, with a double jointed assembly that enables swinging of a mask plate from above or below a projector into the beam path.

To minimize brightness levels in the regions of image tile overlap 20, mask plates 50 or 50' substantially or completely prevent projection of duplicate pixel information by multiple projectors onto the surrounding region of image tile overlap 20. To effect this removal of duplicate pixel information, the first end 66 of each mask rod 54, including the edge surface 88, has a minimum feature size greater than or equal to the thickness dimension, d. Further, the thickness dimension d is less than or equal to a value, $d_{max}$. Limiting the thickness dimension of the rod ends 66 (including the edge surfaces 88) to $d_{max}$ enables articulation of the edge contour 70 with sufficient definition to remove brightness artifact along the transition. That is, with $d<d_{max}$, several adjoining rod first ends have sufficient resolution to define an optimum contour 70 where each edge surface 88 casts a shadow edge corresponding to one of the contiguous contour segments 94 that defines on the screen a transition (e.g., a transition line 84 or transition zone 85) between pixels in a portion of the first image projection beam and pixels in a portion of the second image projection beam on the screen overlap region. In this regard, the term minimum feature size means the smallest physical dimension of a shape in a rod first end 74 that could absorb or reflect light to create a contiguous contour segment 94 on the screen 14. In one implementation of the adjustable optical mask apparatus 75, the masks 50, 50' are positioned one to two inches in front of a 0.73:1 lens 18 and $d_{max}$ ranges between 0.032 and 0.038 inch (e.g., 0.036 inch), and each unit in the pair projects a pixel density at a twenty foot screen distance (i.e., throw distance from the lens 18) of about 5.9 pixels per inch along the first direction $72_H$ on the screen or along the second (vertical) direction $72_V$ perpendicular to the first direction. For example, the system may project image tiles seventeen feet tall (vertical) and 27.4 feet wide (horizontal) on a flat rectangular screen using projectors that provide images with 1920 (vertical) by 1200 (horizontal) pixels. For embodiments having cylindrical shaped rods 54, the diameter of each adjustable rod 54 in a mask plate 50 is sufficiently small to articulate an effective blocking shape. The small rod diameter enables the edge profile to define and cast a shadow which follows necessary image details along one edge of the brightness zone. Although the inventive concepts are not limited to any particular theory, it appears that a blocking shadow created with the rods 54 is of sufficient resolution to follow necessary contour details along one edge of a brightness zone. With on-site adjustment of the rods 54 in the movable plates 50, the rods satisfactorily replicate the edge shape of the brightness zone. As best understood, the term $d_{max}$ defines an upper limit in rod diameter that permits effective removal of all brightness artifact. Although illustrated embodiments may have a value of $d_{max}$ between 0.032 and 0.038 inch, it is to be understood that the inventive concepts may be applied with values of $d_{max}$ larger of smaller than this range. For example, $d_{max}$ may be substantially less than 0.032 inch or 8 mm (e.g., the range of $d_{max}$ may extend to less than one or two mm).

The $d_{max}$ constraint assures that the selected rod diameter is small enough to define an edge profile capable of projecting a shadow edge shape with necessary definition to closely follow the edge shape of the brightness zone. That is, there is sufficient definition to block most or all noticeable brightness artifact. This capability of following edge shape contours enables complete blocking of brightness zone artifact even as the shapes of the brightness zones become more complex and nonlinear, i.e., more difficult to model, due to increased complexities in screen geometries and projector positioning.

Given ongoing demands for greater realism in projection viewings, a continued trend for increased pixel density, and screen geometries having more complex curvature, the invention provides tools and methods by which the profiles of blocking mask plate edge regions can be quickly optimized to mask out brightness artifact. To this end, embodiments of the invention provide high definition variability in edge region profiles. The invention render unnecessary the customary design and fabrication with models which account for asymmetric projection beam angles relative to the screen and complex screen shapes.

Further, with increases in pixel density, and with screen geometries creating more complex shapes for zones of brightness artifact, the edge surface feature sizes and thickness dimensions of the moveable rods can be further reduced as needed to provide smaller contour segments 94 on the screen 14. Specifically, in the foregoing described implementation having a throw distance of twenty feet for a 0.73:1 lens, with cylindrically shaped rods 50, it has been determined that rods having nominal diameters of about 0.036 inch, can eliminate brightness zones on a cylindrical shaped screen on which each of two adjoining projection units provide a 5.9 pixels per inch density. However, with the rods in a series 52 having even smaller feature sizes it is possible to increase the resolution with which a transition line 84 is created. This enables articulation of the rods to render a more optimal transition between image tiles (and removal of brightness artifact) when the units project a higher pixel density on the screen or when the brightness zone has a more complex geometry.

By so integrating the adjustment capability for removing the brightness artifact in blocking mask plates, a low-cost adjustment method is realized. For many, if not all, instances of optical blocking mask applications there is no longer a need to rely on any design tools to predict locations of brightness zones or pre-specify edge contours or undertake an iterative process to adjust edge profiles in the optical mask plates. This is because the ability to vary edge profile contours on site permits rapid trial and error adjustment of the contours and find optimal image border transitions to completely remove brightness artifact between adjoining image tiles. Embodiments of the invention also provide insignificant or minimum levels of reflected light, diffracted light or stray light. As pixel density increases, feature sizes of the rods (e.g., $d_{max}$) may become smaller to avoid degradation in image quality in regions of tile overlap.

An optical mask apparatus 75 comprising one or more mask plates has been described which can controllably modify the projection of brightness artifact on a screen due to duplicate pixel data present in a region of tile overlap. The invention provides a relatively simple means of eliminating unwanted overlapped projection in multiple projector imaging systems. Described embodiments of mask plates are easily adjustable mechanically so that a user can fully mask undesired light in regions of overlap, without super black/total light blockage, on cylindrical or compound curvature screens. A system has been described which can be controlled electronically by contact closure, accessible by a touch panel or other device.

Those skilled in the art will recognize that the apparatus and methods of using the apparatus are not limited that which has been described. Numerous additional modifications will be apparent to those skilled in the art. Accordingly the scope of the invention is only limited by the claims which now follow.

The claimed invention is:

1. An image projection system for presenting a continuous image with projection beams from at least one pair of adjacent projection units, the system directing at least a pair of overlapping image tiles toward a screen, with portions of each image tile in the pair directed toward an overlap region on the screen, the system comprising first and second optical mask plates for defining on the overlap region a transition between projection of just one or just the other in the pair of overlapping image tiles to reduce or eliminate projection of overlapping pixel data from different projection units in the pair, the first and second optical mask plates each providing an edge profile to define the transition, when the system projects the pair of overlapping image tiles toward the screen, by positioning each plate to block a portion of a different projection beam from the pair of adjacent units with a provided edge profile, wherein:

(a) when the first optical mask plate is positioned in the path of a first image projection beam sent toward the screen by a first unit in the pair and the second optical mask plate is positioned in the path of a second image projection beam sent toward the screen by a second unit in the pair, at least the edge profile of the first optical mask plate is adjustable to vary the transition to block a selectable portion of the first image projection beam from reaching the overlap region, (b) the first optical mask plate comprises a plurality of adjoining rods positioned side by side, parallel with one another, so each extends along a common first direction and a common plane, each rod having a first end wherein multiple rod first ends each adjoin another rod first end to limit transmission of projection beam light through the first mask plate, and the rods are each moveable in the first direction with respect to an adjoining rod first end to enable selectable definition of the edge profile while the first optical mask plate is positioned to block part of the first image projection beam, (c) each of several of the rod first ends includes an edge surface, and imposition of the edge surfaces in the projection beam results in projection of a contiguous series of segments along a transition on the screen, and each of the several rod first ends has a thickness dimension, d, measurable in a second direction perpendicular to the first direction and parallel to the plane, with the edge surface contour of each of the several rod first ends having a minimum feature size greater than or equal to d, and (d) the thickness dimension d is less than or equal to a value, $d_{max}$, which dimension is sufficiently small to enable adjustment of the first mask plate to remove bright spots from the first projection beam along the transition by adjustment of the several rod first ends to create an edge profile to define on the screen a transition between pixels in the first image projection beam and pixels in the second image projection beam on the screen overlap region.

2. The system of claim 1 wherein at least the edge region optical mask profile of the first mask plate is adjustable after being positioned to block part of the first image projection beam.

3. The system of claim 1 wherein the edge region optical mask profiles of the first and second mask plates are adjustable to cooperatively block parts of the first and second image projection beams and form a seamless transition along the line of transition.

4. The system of claim 1 wherein, relative to a pair of mask plates having only non-adjustable edge region optical mask profiles arranged to block (i) a portion of the first image projection beam from reaching the first subregion, and (ii) a portion of the second image projection beam from reaching the second subregion: said multiple ones of the rod first ends do not include features that diffuse or diffract light from the first projection beam that alters brightness across the transition on the screen along the transition.

5. The system of claim 1 wherein, when the first optical mask plate is positioned in the path of a first image projection beam sent toward the screen by a first unit in the pair and the second optical mask plate is positioned in the path of a second image projection beam sent toward the screen by a second unit in the pair: the edge profile of each optical mask plate is adjustable to vary the transition to block a selectable portion of the first image projection beam from reaching the overlap region and block a selectable portion of the second image projection beam from reaching the overlap region to reduce brightness artifact in the overlap region.

6. The system of claim 1 wherein $d_{max}$ is less than 0.038 inch.

7. The system of claim 1 wherein $d_{max}$ is less than 0.032 inch and each unit projects a pixel density of at least 5.9 pixels per inch on the screen.

8. For use in an image projection system of the type which presents a continuous image with projection beams from at least one pair of adjacent projection units, the system directing at least a pair of overlapping image tiles toward a screen, with portions of each image tile in the pair directed toward an overlap region on the screen, an optical mask apparatus for defining on the overlap region a transition line or zone between projection of just one or just the other in the pair of overlapping image tiles, each unit projecting along the transition line or zone an average pixel density, the optical mask apparatus comprising:

first and second optical mask plates, each providing an edge profile to define a line or zone of transition, when the system projects the pair of overlapping image tiles toward the screen, by each plate blocking a portion of a different one of the two adjacent projection beams with a provided edge profile to create a transition between portions of an image formed on the overlap region with the different projection beams.

9. The optical mask apparatus of claim 8 wherein the edge profiles enable a brightness reduction in the overlap region and a transition between the projection beams without loss in image resolution.

10. The optical mask apparatus of claim 8, wherein:
when the first optical mask plate is positioned in the path of a first image projection beam sent toward the screen by a first unit in the pair and the second optical maskplate is positioned in the path of a second image projection beam sent toward the screen by a second unit in the pair, the optical mask apparatus is adjustable to
(i) vary the line or zone of transition and thereby block a selectable portion of the first image projection beam from reaching the overlap region on the screen, and
(ii) block a selectable portion of the second image projection beam from reaching the overlap region to reduce brightness of the overlap region.

11. The optical mask apparatus of claim 8, wherein:
the first optical mask plate comprises a plurality of adjoining rods positioned side by side along a plane, parallel with one another, so each extends along a common first direction, each rod having a first end wherein multiple rod first ends each adjoin another rod first end to limit transmission of projection beam light through the first blend plate, and the rods are each moveable in the first direction with respect to an adjoining rod first end to enable adjustable definition of the edge profile of the first optical mask plate while the first optical mask plate is positioned to block part of the first image projection beam.

12. The optical mask apparatus of claim 11, wherein:
each of several of the rod first ends includes an edge surface, and imposition of the edge surfaces in the projection beam results in projection of a contiguous series of segments along the line or zone of transition, and a portion of each of the several rod first ends extending away from the edge surface has a thickness dimension, d, measurable in a second direction perpendicular to the first direction and parallel to the plane, with the edge surface contour of each of the several rod first ends having a minimum feature size greater than or equal to d.

13. The optical mask apparatus of claim 12, wherein:
the thickness dimension, d, is less than or equal to a value, $d_{max}$, which dimension is sufficiently small to enable adjustment of the first mask plate to remove bright spots from the first projection beam along the transition by adjustment of the several rod first ends to create an edge profile to define on the screen a transition between pixels in the first image projection beam and pixels in the second image projection beam on the screen overlap region.

14. The optical mask apparatus of claim 13, wherein:
each rod first end has a thickness dimension less than 0.038 inch as measured in the second direction to enable sufficient adjustment resolution to eliminate the bright spots.

15. The optical mask apparatus of claim 14, wherein the average pixel density along a surface of the screen is at least 5 pixels per inch.

16. The optical mask apparatus of claim 12, wherein:
levels of light diffusion and diffraction characteristic of blocking the projection beams with the first and second optical mask plates is no greater than those levels which would result with a pair of installed and non-adjustable optical mask plates each having only non-adjustable, fixed optical mask edge profiles, each non-adjustable profile being a fixed contour having a continuous slope arranged to (i) block a portion of the first image projection beam from reaching a first subregion in the overlap region on the screen, and (ii) block a portion of the second image projection beam from reaching a second subregion in the overlap region on the screen, the second subregion different from the first subregion.

17. The optical mask apparatus of claim 16, wherein:
said multiple ones of the rod first ends, relative to the installed and non-adjustable optical mask plates, do not include features that generate greater light diffusion or greater light diffraction from the first projection beam to alter brightness across the transition line or degrade image resolution along the transition line.

* * * * *